United States Patent
Tsai et al.

(10) Patent No.: US 12,539,511 B2
(45) Date of Patent: Feb. 3, 2026

(54) MICROFLUIDIC CHIP AND METHOD FOR USING THE SAME

(71) Applicant: AUO Corporation, Hsinchu (TW)

(72) Inventors: Lo-Hsien Tsai, Hsinchu (TW); Yu-Jung Liu, Hsinchu (TW)

(73) Assignee: AUO Corporation, Hsinchu (TW)

( * ) Notice: Subject to any disclaimer, the term of this patent is extended or adjusted under 35 U.S.C. 154(b) by 574 days.

(21) Appl. No.: 18/083,584

(22) Filed: Dec. 19, 2022

(65) Prior Publication Data
US 2023/0415152 A1    Dec. 28, 2023

(30) Foreign Application Priority Data
Jun. 27, 2022 (TW) ................... 111123835

(51) Int. Cl.
*B01L 3/00* (2006.01)
*B01L 7/00* (2006.01)

(52) U.S. Cl.
CPC .......... *B01L 3/502715* (2013.01); *B01L 7/52* (2013.01); *B01L 2300/0645* (2013.01); *B01L 2300/1827* (2013.01); *B01L 2400/0415* (2013.01)

(58) Field of Classification Search
None
See application file for complete search history.

(56) References Cited

U.S. PATENT DOCUMENTS

| | | | |
|---|---|---|---|
| 8,419,273 B2 * | 4/2013 | Hadwen | G01K 7/01 374/112 |
| 8,980,075 B2 | 3/2015 | Cheng et al. | |
| 11,938,481 B2 * | 3/2024 | Liu | B01L 3/502784 |
| 2007/0286739 A1 * | 12/2007 | Hsieh | F04B 43/043 417/53 |
| 2011/0077897 A1 * | 3/2011 | Hasson | G06F 17/12 324/693 |
| 2011/0097763 A1 * | 4/2011 | Pollack | B01L 7/52 435/91.2 |
| 2011/0272575 A1 * | 11/2011 | Kim | B01L 3/502792 137/341 |
| 2013/0026040 A1 | 1/2013 | Cheng et al. | |
| 2013/0059366 A1 * | 3/2013 | Pollack | B01L 3/502715 435/287.2 |

(Continued)

FOREIGN PATENT DOCUMENTS

EP    1974816    10/2008

*Primary Examiner* — Brian R Gordon
(74) *Attorney, Agent, or Firm* — JCIPRNET

(57) ABSTRACT

A microfluidic chip suitable for controlling movement and detecting position of a microfluid includes a first substrate, a second substrate, first scan lines, first signal lines, second scan lines, second signal lines, actuating units, and heating units. The first scan lines and the first signal lines are disposed on the first substrate. The second scan lines and the second signal lines are disposed on the second substrate. The actuating units each have a first active device and a driving electrode. The first active device is electrically connected to one of the first scan lines, one of the first signal lines, and the driving electrode. The heating units are respectively disposed corresponding to the actuating units, and each have a second active device and a negative temperature coefficient thermistor. The second active device is electrically connected to one of the second scan lines and one of the second signal lines.

18 Claims, 40 Drawing Sheets

(56) References Cited

U.S. PATENT DOCUMENTS

| | | | |
|---|---|---|---|
| 2013/0168250 A1* | 7/2013 | Fogleman | C12Q 1/6825 |
| | | | 204/549 |
| 2013/0217103 A1* | 8/2013 | Bauer | G01N 27/44791 |
| | | | 422/501 |
| 2013/0217113 A1* | 8/2013 | Srinivasan | C12N 1/066 |
| | | | 435/306.1 |
| 2013/0293011 A1* | 11/2013 | Kung | H02J 7/35 |
| | | | 307/18 |
| 2014/0184950 A1* | 7/2014 | Chu | G06F 3/0446 |
| | | | 349/12 |
| 2014/0210699 A1* | 7/2014 | Liu | G09G 3/3648 |
| | | | 345/98 |
| 2016/0305906 A1* | 10/2016 | Amos | G01N 27/44791 |
| 2018/0001286 A1* | 1/2018 | Wu | B01F 35/92 |
| 2019/0286872 A1* | 9/2019 | Lu | G06V 40/1376 |
| 2020/0171501 A1* | 6/2020 | McEwen | B01L 3/502792 |
| 2020/0391207 A1* | 12/2020 | Pang | B01L 3/502792 |
| 2020/0408611 A1 | 12/2020 | McCulloch et al. | |
| 2021/0114034 A1* | 4/2021 | Lin | C12Q 1/6851 |
| 2022/0193669 A1* | 6/2022 | Gao | G05D 23/24 |
| 2022/0395835 A1* | 12/2022 | Soto-Moreno | G01N 35/00069 |
| 2024/0165616 A1* | 5/2024 | Lin | B01L 3/50273 |

\* cited by examiner

MICROFLUIDIC CHIP AND METHOD FOR USING THE SAME

CROSS-REFERENCE TO RELATED APPLICATION

This application claims the priority benefit of Taiwan application serial no. 111123835, filed on Jun. 27, 2022. The entirety of the above-mentioned patent application is hereby incorporated by reference herein and made a part of this specification.

BACKGROUND

Technical Field

The disclosure relates to a microfluidic control device and a method for using the same, and in particular, to a microfluidic chip and a method for using the same.

Related Art

Microfluidics technology has many applications in conventional biochemical analyses, including, for example, micro pumps, micro valves, micro filters, micro mixers, micro pipes, and micro sensors. Many of these applications are manufactured on biological chips for processes such as sample pretreatment, mixing, transmission, separation, and detection. Performing biomedical testing or analyses by utilizing a microfluidic chip can reduce experimental errors in manual operations, improve system stability, reduce energy consumption and sample consumption, save manpower and time, and so on.

Generally, much of the testing or analysis in the microfluidic chip is performed within a specific temperature range, so a heating device needs to be provided. For example, a microelectromechanical heating device may be directly formed in specific regions in a microfluidic chip. In addition, to position the microfluid in the chip, images are taken with a camera in the related art, but doing so also limits the convenience of operation of the microfluidic chip.

SUMMARY

An embodiment of the disclosure provides a microfluidic chip in which functions of microfluid heating and position detection can be performed by the same heating structure, so the microfluidic chip has a simplified structural design.

An embodiment of the disclosure provides a method for using a microfluidic chip, which determines the position of a microfluid by a heating means.

A microfluidic chip according to an embodiment of the disclosure is suitable for controlling movement of a microfluid and detecting a position of the microfluid, and includes a first substrate, a second substrate, a plurality of first scan lines, a plurality of first signal lines, a plurality of second scan lines, a plurality of second signal lines, a plurality of actuating units, and a plurality of heating units. The second substrate is disposed opposite to the first substrate. The first scan lines and the first signal lines are disposed on the first substrate. The second scan lines and the second signal lines are disposed on the second substrate. The actuating units are disposed on the first substrate and each include a first active device and a driving electrode. The first active device is electrically connected to one of the first scan lines, one of the first signal lines, and the driving electrode. The heating units are disposed on the second substrate and disposed respectively corresponding to the actuating units. Each of the heating units includes a second active device and a negative temperature coefficient thermistor. The second active device is electrically connected to one of the second scan lines and one of the second signal lines.

A method for using a microfluidic chip according to an embodiment of the disclosure includes steps below. A plurality of heating units are enabled to perform a first heating step. A current value of a current flowing through a negative temperature coefficient thermistor of each of the heating units or a cross voltage across the negative temperature coefficient thermistor of each of the heating units is compared to obtain an initial position of a microfluid. A part of the heating units that are in contact with the microfluid at the initial position are disabled.

Based on the above, in the microfluidic chip and the method for using the same according to an embodiment of the disclosure, in addition to heating the microfluid, the heating units may also be used to detect the position of the microfluid. In the heating process, a resistance value change of the negative temperature coefficient thermistor of the heating unit covered by the microfluid is different from that of the negative temperature coefficient thermistor of other heating units not covered by the microfluid. The position of the microfluid is obtained by detecting a change in the cross voltage or current arising from the resistance value change. Since the microfluidic chip of the disclosure can obtain the position of the microfluid without additionally providing sensors, it can have a simplified structural design.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
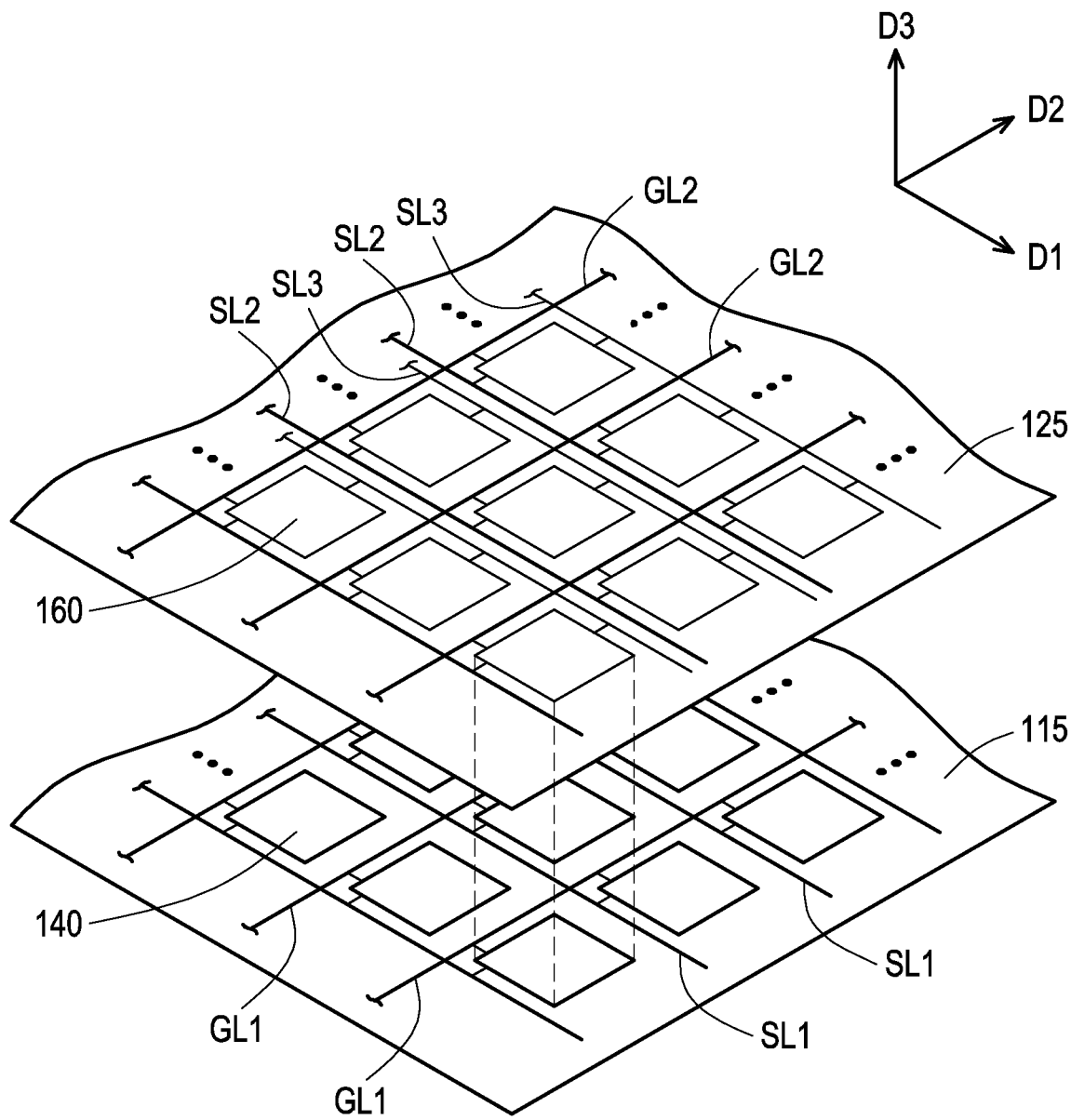
FIG. 1 is a schematic view of part of film layers of a microfluidic chip according to a first embodiment of the disclosure.

The terms "about", "approximately", "essentially", or "substantially" as used herein are inclusive of a stated value and means within an acceptable range of deviation for a particular value as determined by people having ordinary skill in the art, considering the measurement in question and the particular quantity of errors associated with measurement (i.e., the limitations of the measurement system). For example, "about" may mean within one or more standard deviations or within ±30%, ±20%, ±15%, ±10%, or ±5% of the stated value. Furthermore, a relatively acceptable range of deviation or standard deviation may be selected for the term "about", "approximately", "essentially", or "substantially" as used herein based on measurement properties, cutting properties, or other properties, instead of applying one standard deviation across all properties.

In the drawings, thicknesses of layers, films, panels, regions, etc., are exaggerated for the sake of clarity. It should be understood that when an element such as a layer, film, region, or substrate is referred to as being "on" or "connected to" another element, it may be directly on or connected to another element, or intermediate elements may also be present. Comparatively, when an element is referred to as being "directly on" or "directly connected to" another element, no intermediate elements are present. As used herein, the term "connection" may refer to physical and/or electrical connection. Furthermore, "electrical connection" may encompass the presence of other elements between two elements.

Moreover, relative terms such as "lower" or "bottom" and "upper" or "top" may herein serve for describing the relation between one element and another element as shown in the drawings. It should also be understood that the relative terms are intended to include different orientations of a device in addition to the orientation as shown in the drawings. For example, if a device in the drawings is turned upside down, an element described as being on the "lower" side of another element shall be re-orientated to be on the "upper" side of the another element. Therefore, the exemplary term "lower" may include the orientations of "lower" and "upper", depending on the specific orientation of the drawings. Similarly, if a device in the drawings is turned upside down, an element described to be "below" or "beneath" another element shall be re-orientated to be "above" the another element. Therefore, the exemplary term "above" or "below" may include the orientations of above and below.

Exemplary embodiments will be described herein with reference to schematic cross-sectional views illustrating idealized embodiments. Therefore, variations of shapes in the drawings resulting from manufacturing technologies and/or tolerances, for example, are to be expected. Accordingly, the embodiments described herein should not be construed as being limited to the particular shapes of regions as shown herein but including deviations in shapes resulting from manufacturing, for example. For example, regions shown or described as being flat may typically have rough and/or non-linear features. In addition, an acute angle as shown may be round. Therefore, regions as shown in the drawings are schematic in nature, and their shapes are not intended to show the exact shapes of the regions, nor intended to limit the scope of the claims.

Reference will now be made in detail to the exemplary embodiments of the disclosure, examples of which are illustrated in the accompanying drawings. Wherever possible, the same reference signs will be used in the drawings and description to refer to the same or like parts.

Figure 2:
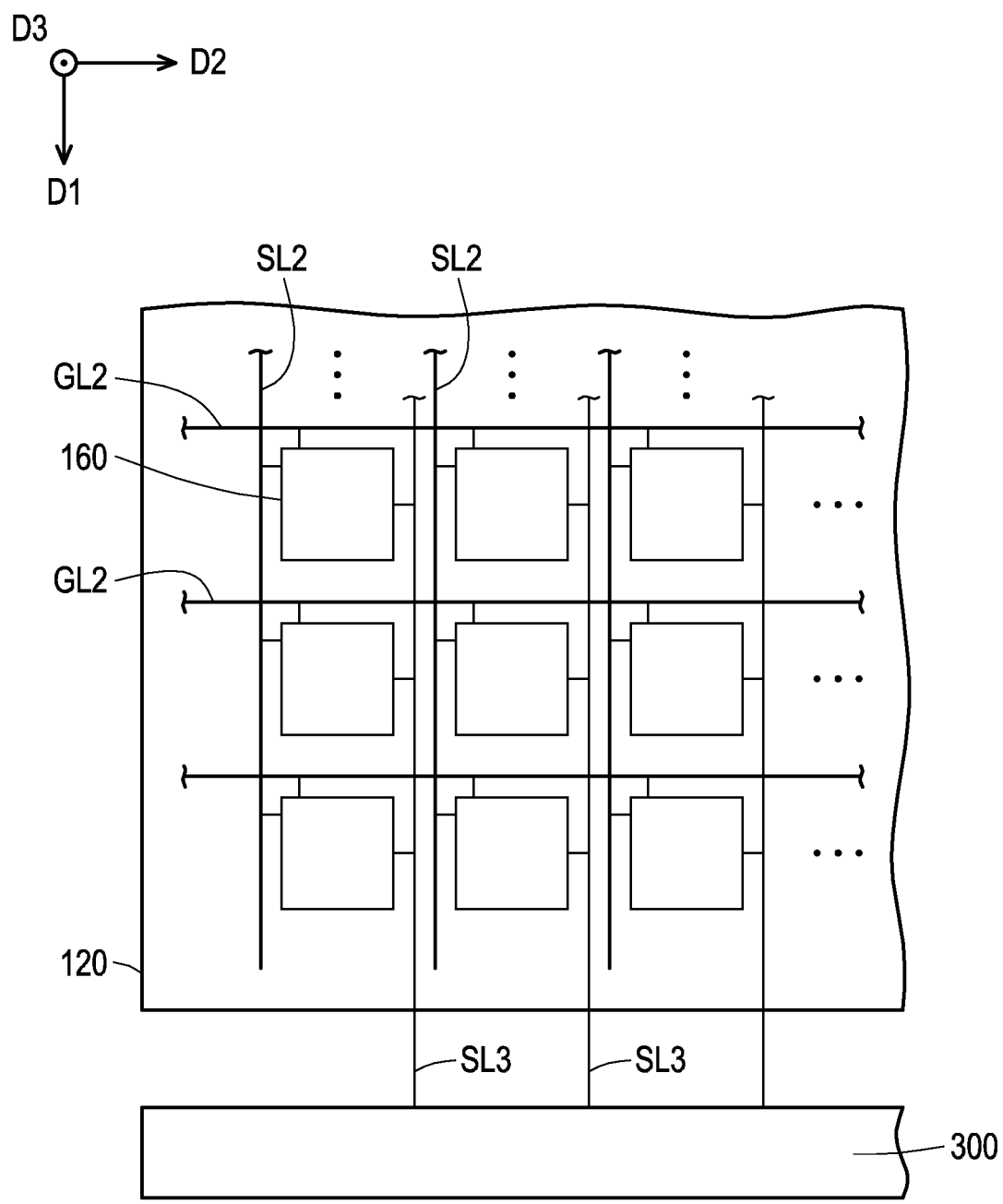
FIG. 2 is a schematic top view of the microfluidic chip according to the first embodiment of the disclosure.
Figure 3:
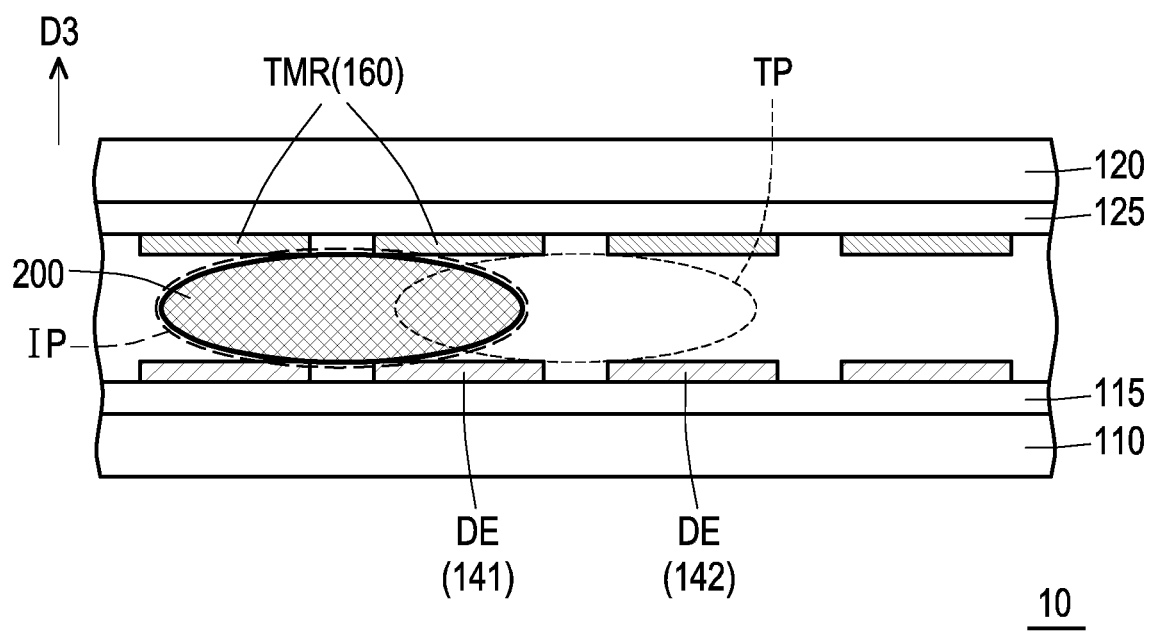
FIG. 3 is a schematic cross-sectional view of the microfluidic chip according to the first embodiment of the disclosure.
Figure 4A:
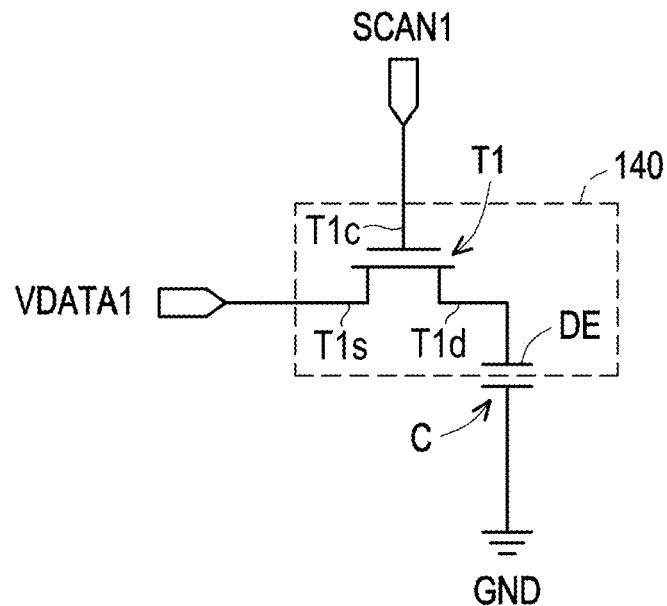
FIG. 4A and FIG. 4B are schematic circuit diagrams of an actuating unit and a heating unit in FIG. 1, respectively.
Figure 4B:
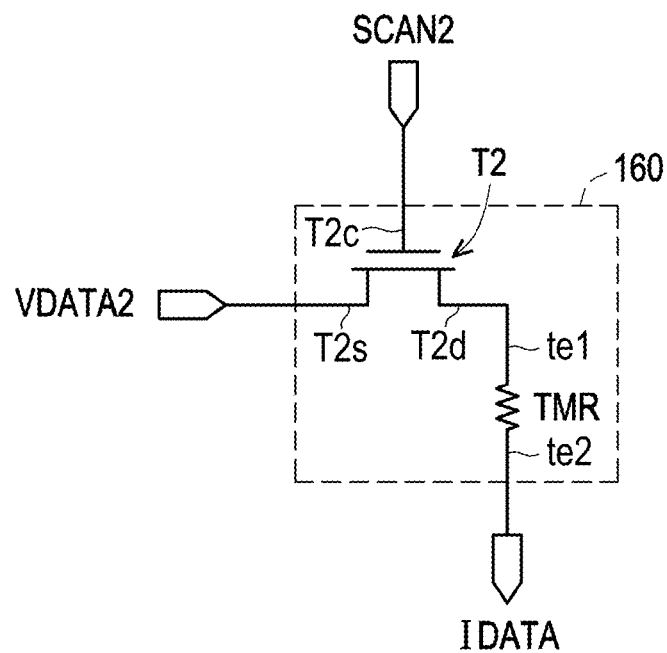

FIG. 1 is a schematic view of part of film layers of a microfluidic chip according to a first embodiment of the disclosure. FIG. 2 is a schematic top view of the microfluidic chip according to the first embodiment of the disclosure. FIG. 3 is a schematic cross-sectional view of the microfluidic chip according to the first embodiment of the disclosure. FIG. 4A and FIG. 4B are schematic circuit diagrams of an actuating unit and a heating unit in FIG. 1, respectively. FIG. 5A to FIG. 5E are schematic top views of an operation flow of the microfluidic chip in FIG. 3. FIG. 6A to FIG. 6E are schematic cross-sectional views of the operation flow of the microfluidic chip in FIG. 3. For clarity, FIG. 5A to FIG. 5E only show a second substrate 120 and a negative temperature coefficient thermistor TMR of a heating unit 160 in FIG. 3, and FIG. 2 only shows the film layer structure on the second substrate 120 in FIG. 3.

Referring to FIG. 1 to FIG. 3, a microfluidic chip 10 is suitable for controlling movement of a microfluid 200 and detecting a position of the microfluid 200, and includes a first substrate 110, a second substrate 120, a first driving circuit layer 115, a second driving circuit layer 125, a plurality of actuating units 140, and a plurality of heating units 160. The first substrate 110 and the second substrate 120 are disposed opposite to each other. The first driving circuit layer 115 is disposed on a surface of the first substrate 110 facing the second substrate 120, and the second driving circuit layer 125 is disposed on a surface of the second substrate 120 facing the first substrate 110.

The first driving circuit layer 115 is provided with a plurality of first scan lines GL1 and a plurality of first signal lines SL1. The second driving circuit layer 125 is provided with a plurality of second scan lines GL2 and a plurality of second signal lines SL2. For example, in this embodiment, the first scan lines GL1 are arranged on the first substrate 110 along a direction D1 and extend in a direction D2. The first signal lines SL1 are arranged on the first substrate 110 along the direction D2 and extend in the direction D1. The second scan lines GL2 are arranged on the second substrate 120 along the direction D1 and extend in the direction D2. The second signal lines SL2 are arranged on the second substrate 120 along the direction D2 and extend in the direction D1. The direction D1 may optionally be perpendicular to the direction D2.

The plurality of actuating units 140 may be arranged in an array along the direction D1 and the direction D2, and may each include a first active device T1 and a driving electrode DE. The first active device T1 is electrically connected to the driving electrode DE, one of the first scan lines GL1, and one of the first signal lines SL1. Referring to FIG. 4A at the same time, specifically, a control terminal T1c of the first active device T1 may receive a first scan signal SCAN1 from the first scan line GL1, and a source terminal T1s of the first active device T1 may receive a first voltage signal VDATA1 from the first signal line SL1. The driving electrode DE is electrically connected to a drain terminal T1d of the first active device T1.

When the microfluid 200 is to be driven to move, for example, moving from an initial position IP to a target position TP in FIG. 3, a voltage difference is present between the driving electrode DE of the actuating unit 141 overlapping with the microfluid 200 and the driving electrode DE of the actuating unit 142, so that the microfluid 200 having polarity moves in a transverse electric field generated by the voltage difference. For example, in this embodiment, the first driving circuit layer 115 may be further provided with a common electrode layer (not shown). The common electrode layer may have a ground potential and form a capacitor C as shown in FIG. 4A with the driving electrode DE of the actuating unit 140. However, the disclosure is not limited thereto. In other embodiments, the actuating unit for the microfluid 200 and its actuation may also vary according to different product applications or designs.

The plurality of heating units 160 may be arranged in an array along the direction D1 and the direction D2, and may each include a second active device T2 and a negative temperature coefficient thermistor TMR. The second active device T2 is electrically connected to the negative temperature coefficient thermistor TMR, one of the second scan lines GL2, and one of the second signal lines SL2. Referring to FIG. 4B at the same time, specifically, a control terminal T2c of the second active device T2 may receive a second scan signal SCAN2 from the second scan line GL2, and a source terminal T2s of the second active device T2 may receive a second voltage signal VDATA2 from the second signal line SL2. A first terminal te1 of the negative temperature coefficient thermistor TMR is electrically connected to a drain terminal T2d of the second active device T2.

In this embodiment, the second driving circuit layer 125 is further provided with a plurality of third signal lines SL3, and a second terminal te2 of the negative temperature coefficient thermistor TMR is electrically connected to one of the third signal lines SL3 to transmit a current data IDATA to a reading chip 300. For example, the third signal lines SL3 may be arranged on the second substrate 120 along the direction D2 and extend in the direction D1. In other embodiments, the arrangements of the scan lines and the signal lines may be adjusted according to actual application or design and are not limited herein. Although not shown in the figures, the first scan lines GL1, the second scan lines GL2, the first signal lines SL1, and the second signal lines SL2 may be electrically connected to different driving chips, driving circuits, or circuit boards to receive external control signals.

The plurality of actuating units 140 on the first substrate 110 are respectively disposed corresponding to the plurality of heating units 160 on the second substrate 120 (as shown in FIG. 1), i.e., in a one-to-one configuration. More specifically, the negative temperature coefficient thermistor TMR of any one of the heating units 160 overlaps with the driving electrode DE of the corresponding actuating unit 140 in a stacking direction (e.g., a direction D3) of the two substrates (as shown in FIG. 3).

Figure 5A:
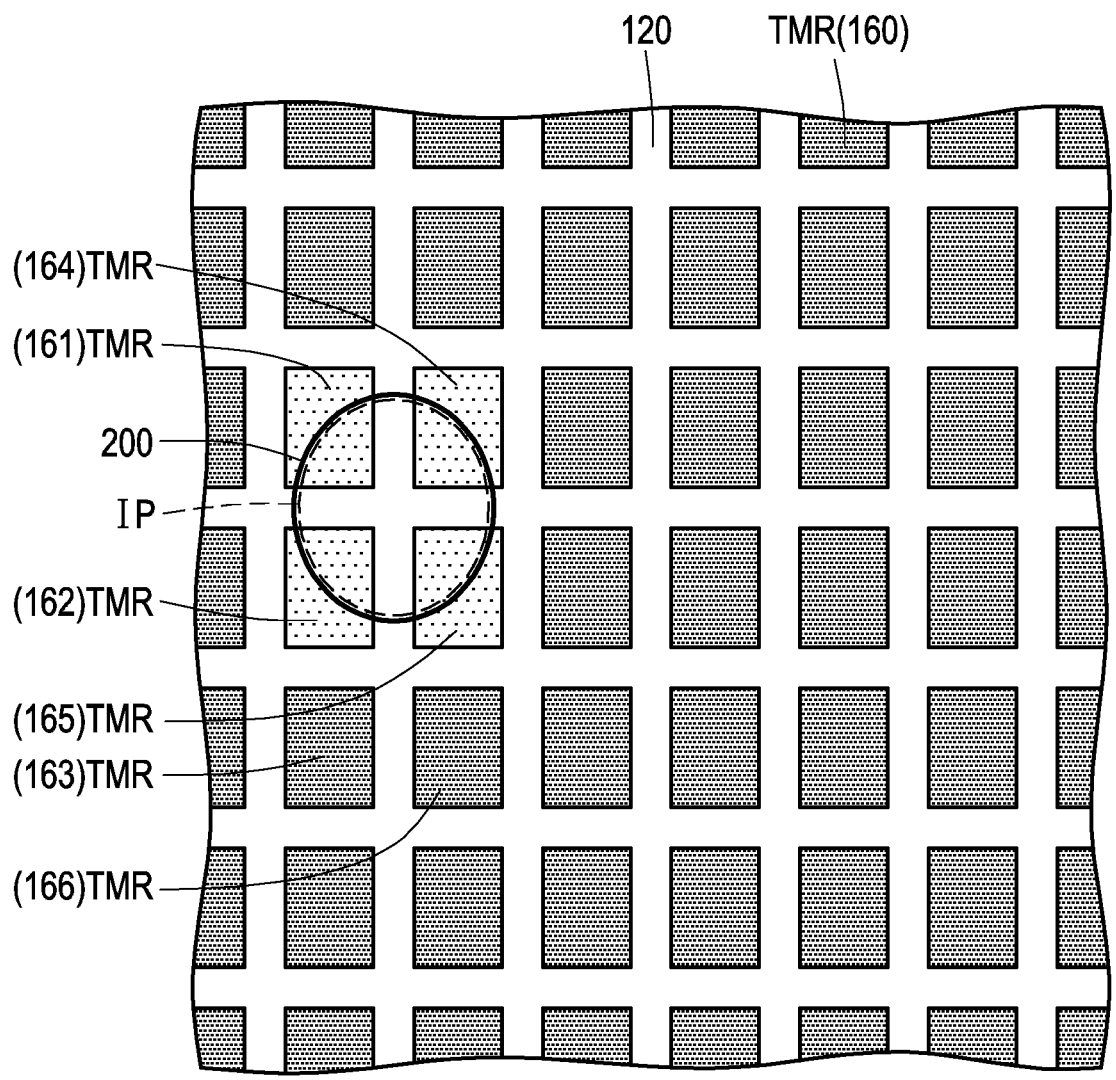
FIG. 5A to FIG. 5E are schematic top views of an operation flow of the microfluidic chip in FIG. 3.
Figure 6A:
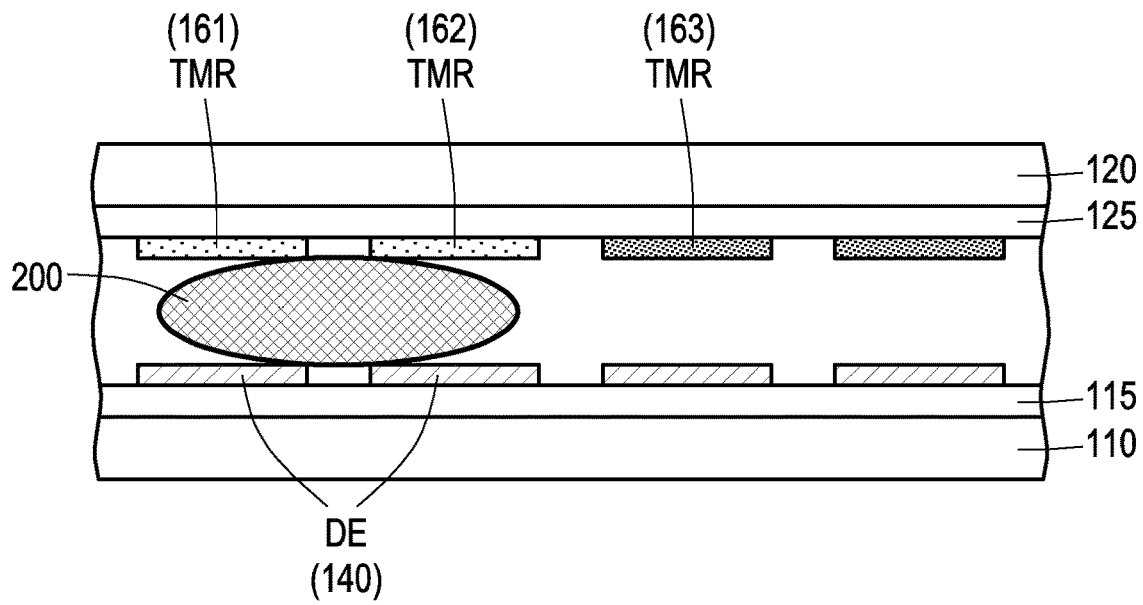
FIG. 6A to FIG. 6E are schematic cross-sectional views of the operation flow of the microfluidic chip in FIG. 3.

A method for using the microfluidic chip 10 will be exemplarily described below. Referring to FIG. 4B, FIG. 5A, and FIG. 6A, first, all the heating units 160 are enabled to perform a first heating step. For example, the second active devices T2 of the plurality of heating units 160 connected to different second scan lines GL2 may be turned on sequentially, so that a current flows through the negative temperature coefficient thermistor TMR to generate heat for performing heating. Next, current values of the currents flowing through the negative temperature coefficient thermistors TMR of the heating units 160 are compared.

The resistance value of the negative temperature coefficient thermistor TMR decreases as the temperature of the negative temperature coefficient thermistor TMR increases, and when all the heating units 160 perform heating with a substantially same setting, the temperatures of the negative temperature coefficient thermistors TMR of the heating units 160 (e.g., the heating unit 161 and the heating unit 162) in contact with the microfluid 200 are lower than those of other heating units 160 (e.g., the heating unit 163) that are not in contact with the microfluid 200. Therefore, the resistance value of the negative temperature coefficient thermistor TMR of the heating unit 161 (or the heating unit 162) is higher than the resistance value of the negative temperature coefficient thermistor TMR of the heating unit 163.

In other words, the current value of the current flowing through the negative temperature coefficient thermistor TMR of the heating unit 161 (or the heating unit 162) is smaller than the current value of the current flowing through the negative temperature coefficient thermistor TMR of the heating unit 163. Therefore, the initial position IP of the microfluid 200 may be obtained by transmitting the current signals (i.e., the current data IDATA) flowing through the heating units 160 to the reading chip 300 for interpretation. For example, the step of interpreting the current signals includes confirming whether the current value of the current flowing through the negative temperature coefficient thermistor TMR of each heating unit 160 is smaller than a predetermined current value, but the disclosure is not limited thereto. In other embodiments, the step of interpreting the current signals may also include confirming whether a difference between two current values of the currents flowing through any two adjacent heating units 160 is greater than a predetermined value. Alternatively, the step may include confirming whether a difference between the current value of the current flowing through each heating unit 160 and an average current value of the currents flowing through all the heating units 160 is greater than a predetermined value.

Figure 5B:
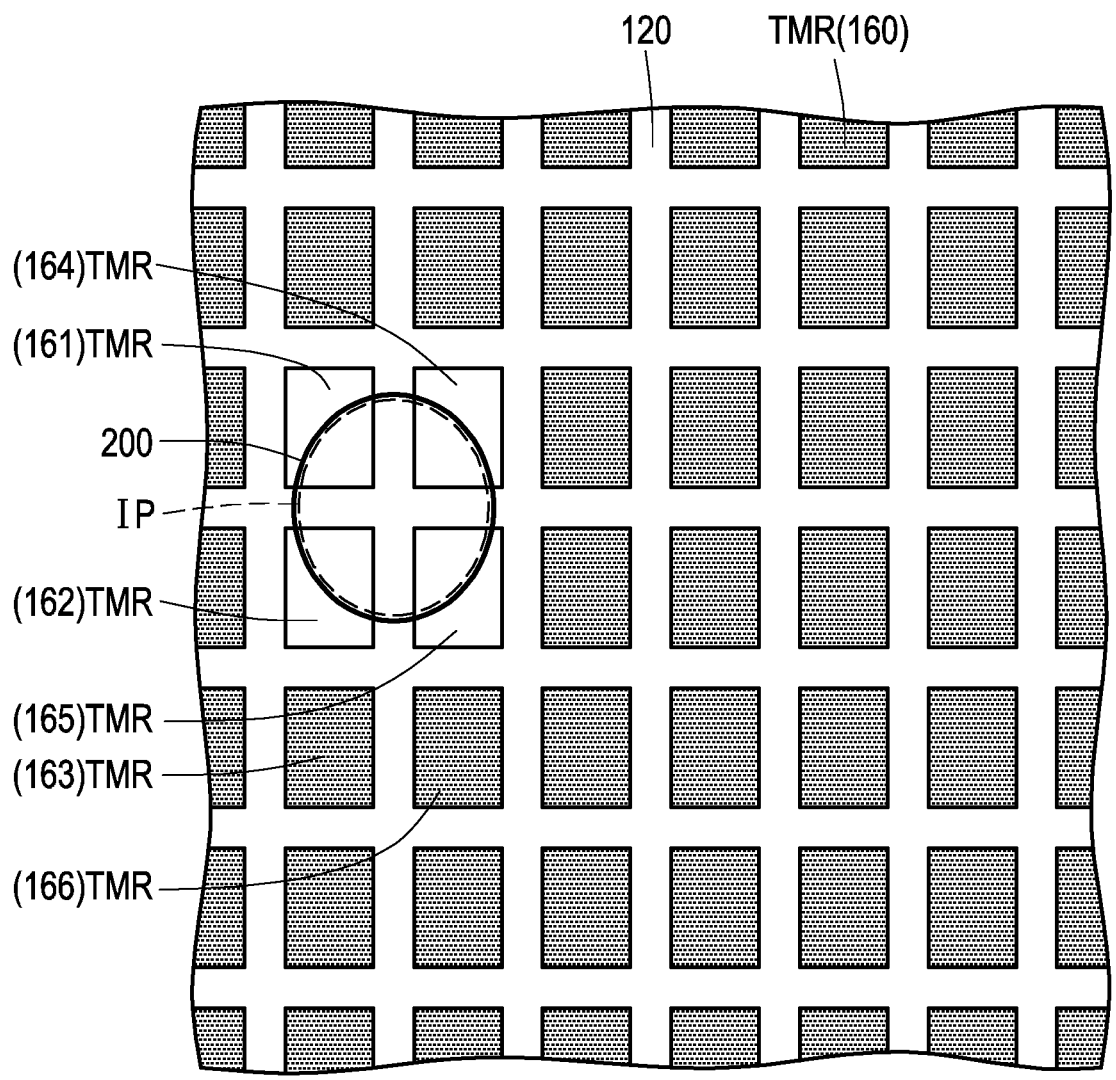
Figure 6B:
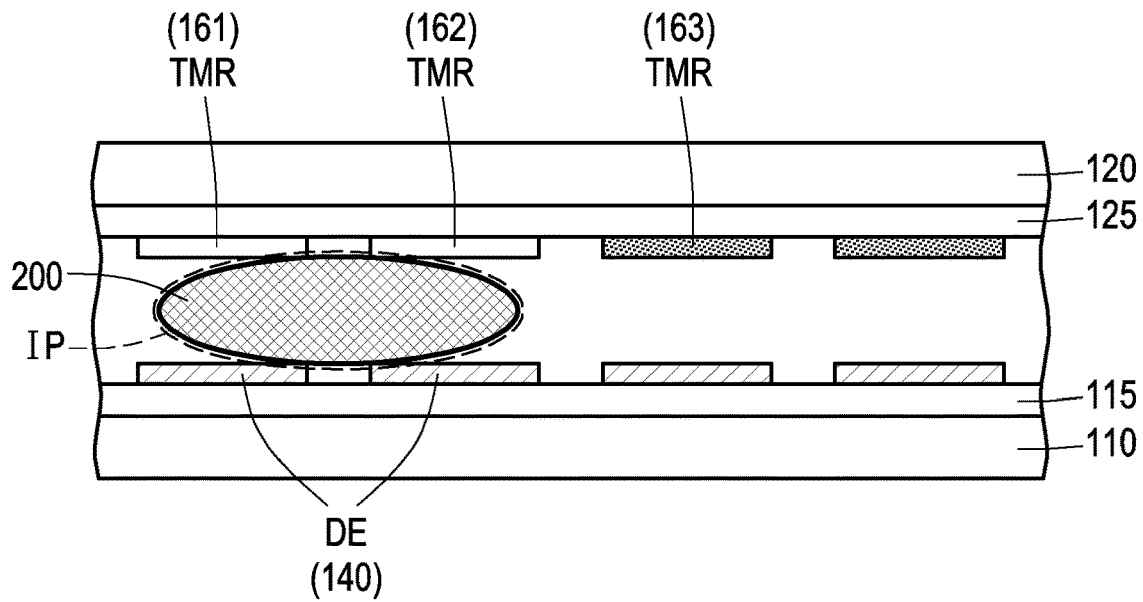

Referring to FIG. 5B and FIG. 6B, after obtaining the initial position IP of the microfluid 200, the heating units 160 (e.g., the heating unit 161, the heating unit 162, the heating unit 164, and the heating unit 165) in contact with the microfluid 200 at the initial position IP are disabled. At this time, the heating units 160 that are not in contact with the microfluid 200 at the initial position IP remain enabled.

Figure 5C:
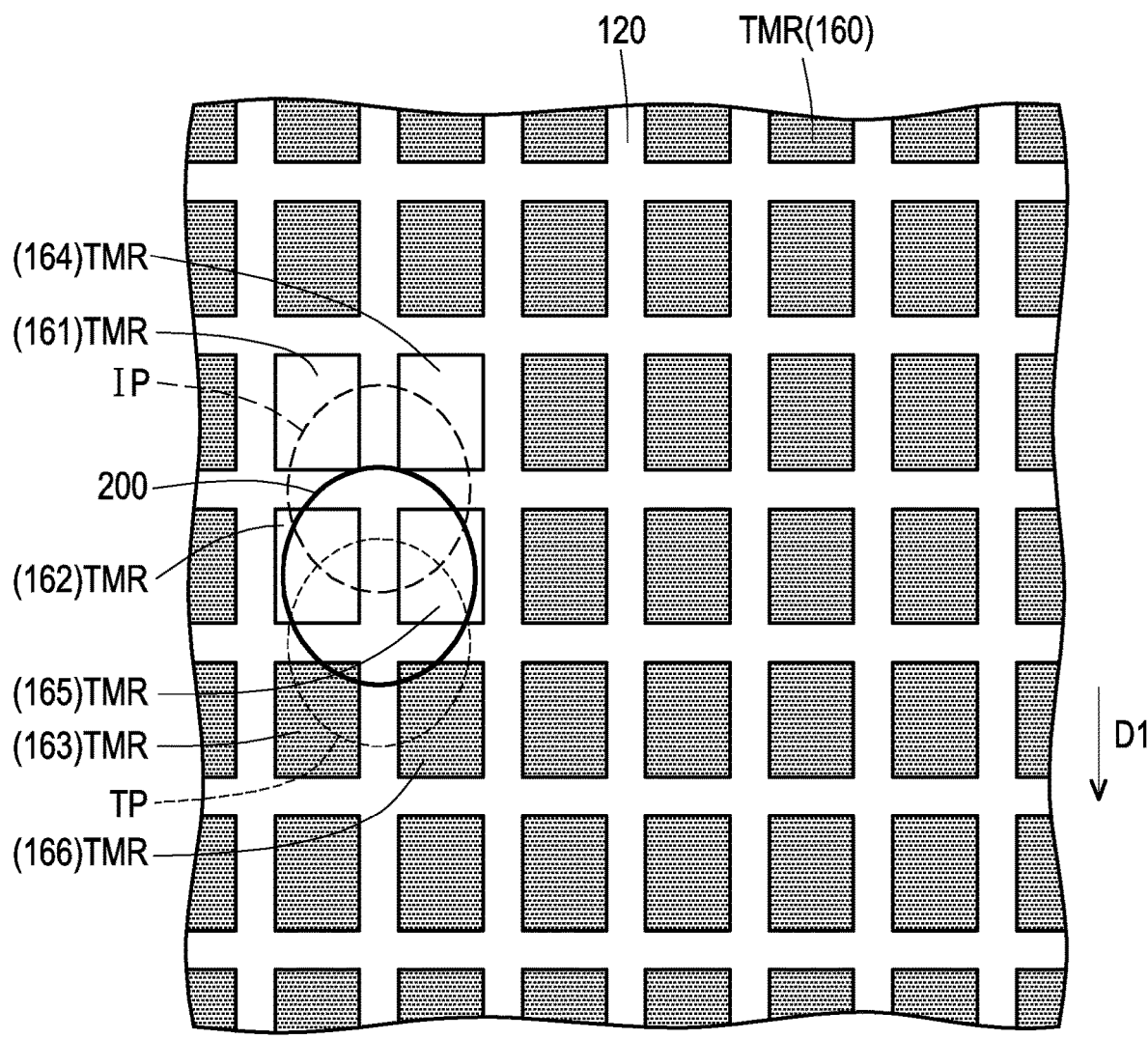
Figure 6C:
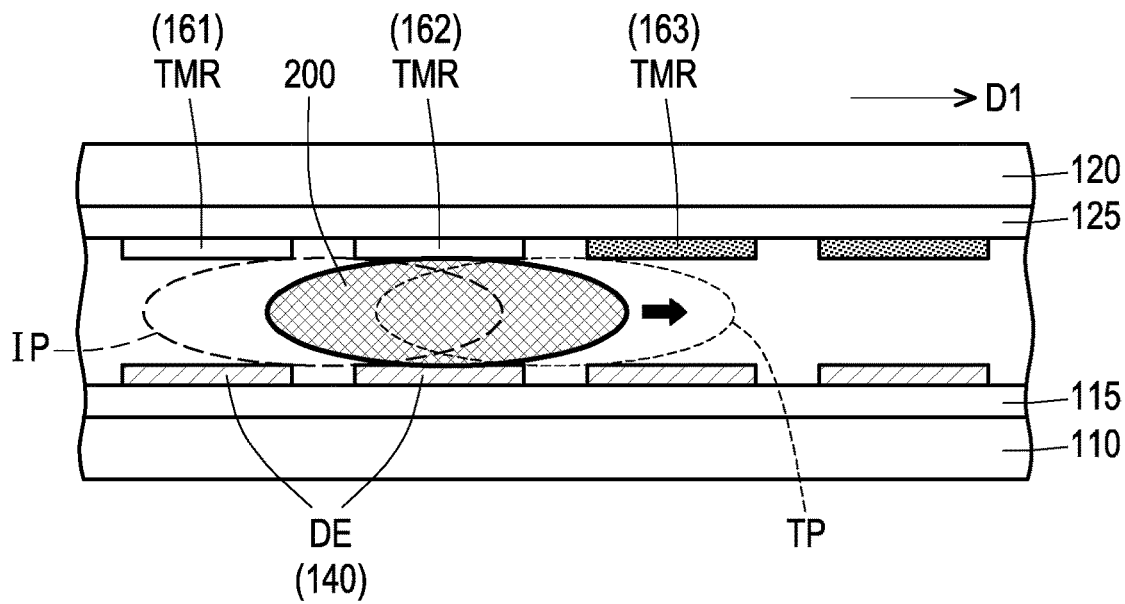

Next, at least two adjacent actuating units 140 of the plurality of actuating units 140 are enabled, so that the microfluid 200 moves from the initial position IP to the target position TP, as shown in FIG. 5C and FIG. 6C. For example, the target position TP of this embodiment is a position overlapping with the heating unit 162, the heating unit 163, the heating unit 165, and the heating unit 166, and the microfluid 200 moves from the initial position IP to the target position TP along the direction D1.

Figure 5D:
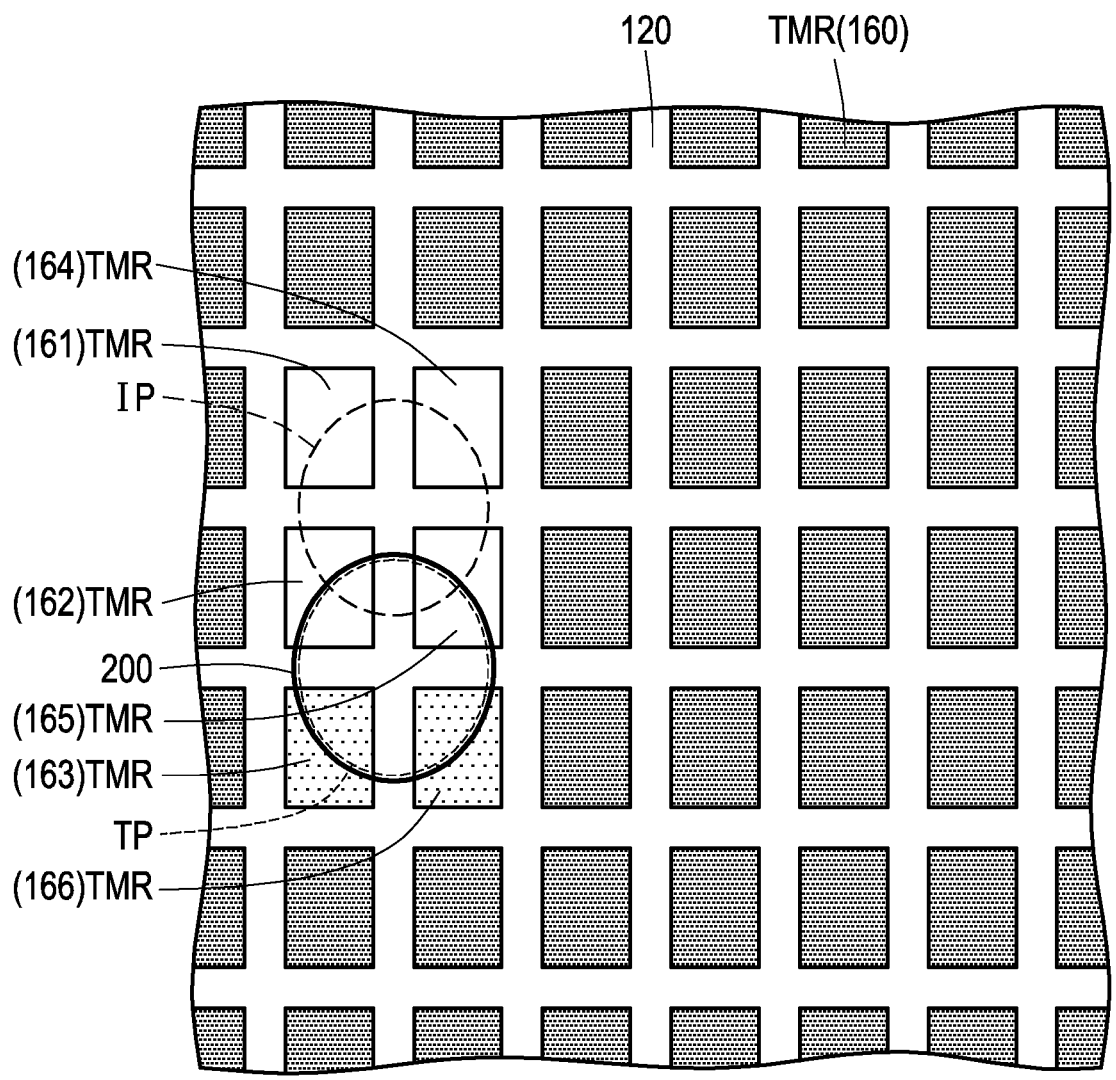
Figure 6D:
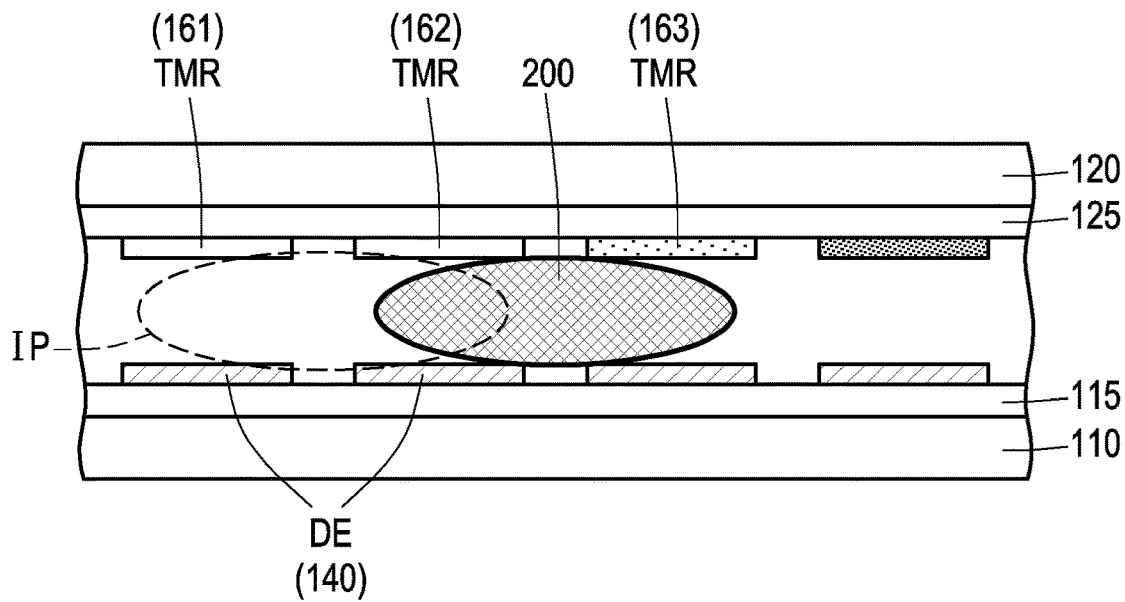

Referring to FIG. 5D and FIG. 6D, when the microfluid 200 moves to the target position TP and contacts the heating unit 163, the temperature of the negative temperature coefficient thermistor TMR of the heating unit 163 decreases. That is, the resistance value of the negative temperature coefficient thermistor TMR of the heating unit 163 is higher than the resistance values of the negative temperature coefficient thermistors TMR of other heating units 160 that are not in contact with the microfluid 200 and are enabled. Therefore, the current value of the current flowing through the heating unit 163 is lower than the current values of the currents flowing through other heating units 160 that are not in contact with the microfluid 200 and are enabled.

Figure 5E:
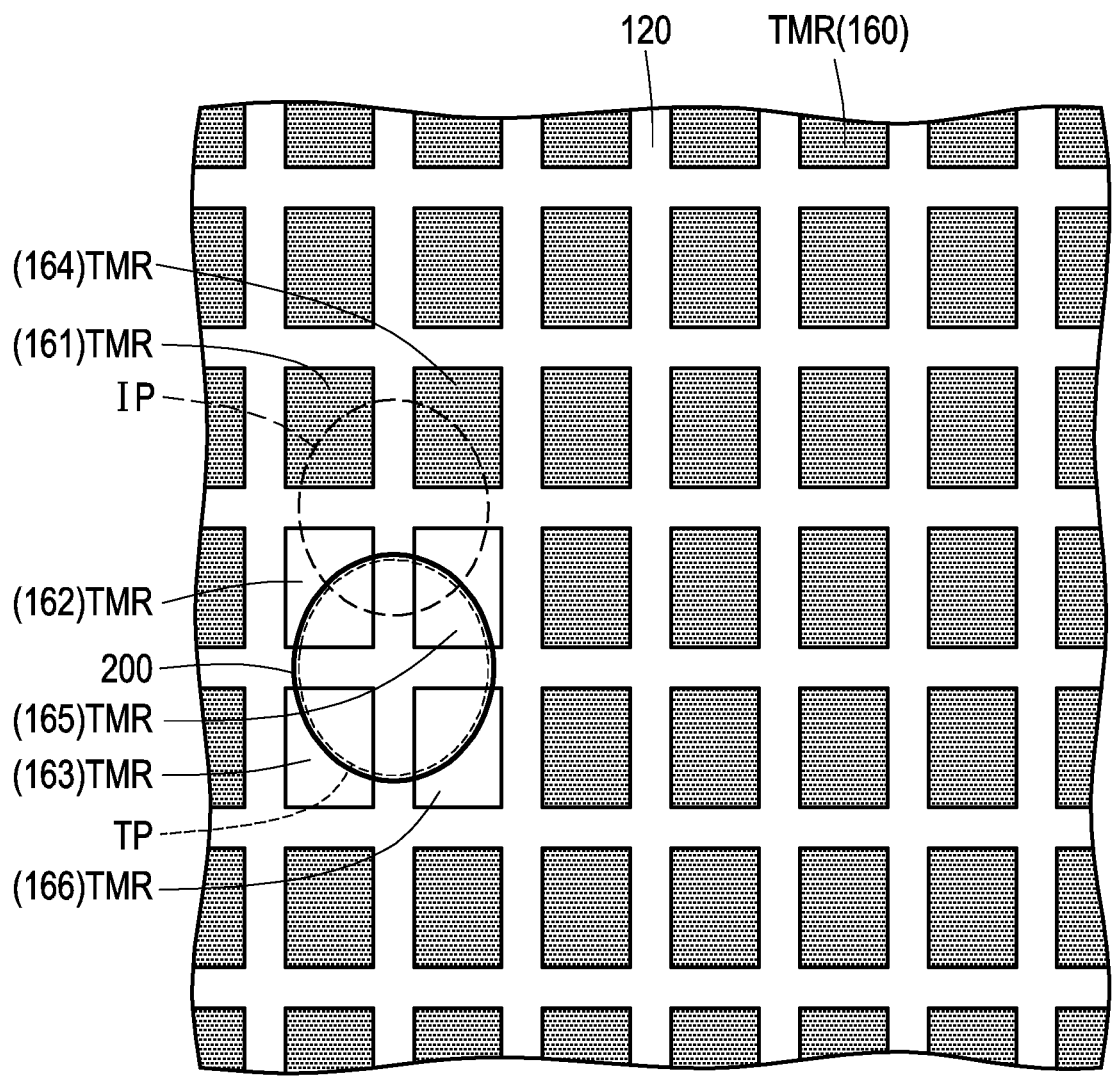
Figure 6E:
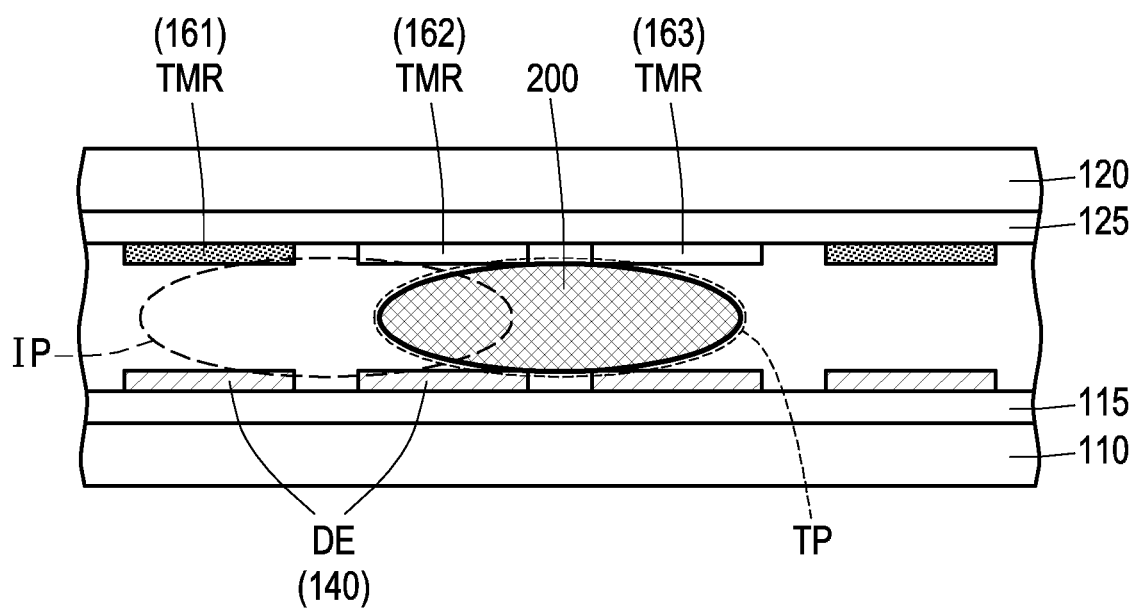

At this time, if the current values of the currents flowing through the negative temperature coefficient thermistors TMR of the heating units 160 are interpreted, it can be confirmed whether the microfluid 200 has moved to the target position TP. After confirming that the microfluid 200 has moved to the target position TP, the heating units 160 (e.g., the heating unit 162, the heating unit 163, the heating unit 165, and the heating unit 166) in contact with the microfluid 200 are disabled, and the heating unit 161 and the heating unit 164 which overlap with the initial position IP but are not in contact with the microfluid 200 are enabled, as shown in FIG. 5E and FIG. 6E.

With the operation method described above, in addition to heating the microfluid 200, the heating units 160 may also be used to detect the position of the microfluid 200. That is, the position of the microfluid 200 can be obtained without additionally providing sensors, so the structural design of the microfluidic chip 10 can be simplified. In addition, during the movement of the microfluid 200, it is also possible to confirm in real time whether the microfluid 200 has moved to the target position TP according to the method described above, which makes real time detection possible.

Other embodiments will be provided below to describe the disclosure in detail. The same components will be labeled with the same reference signs, and descriptions of the same technical contents will be omitted. Reference may be made to the embodiment above for the omitted descriptions, which shall not be repeated herein.

Figure 7:
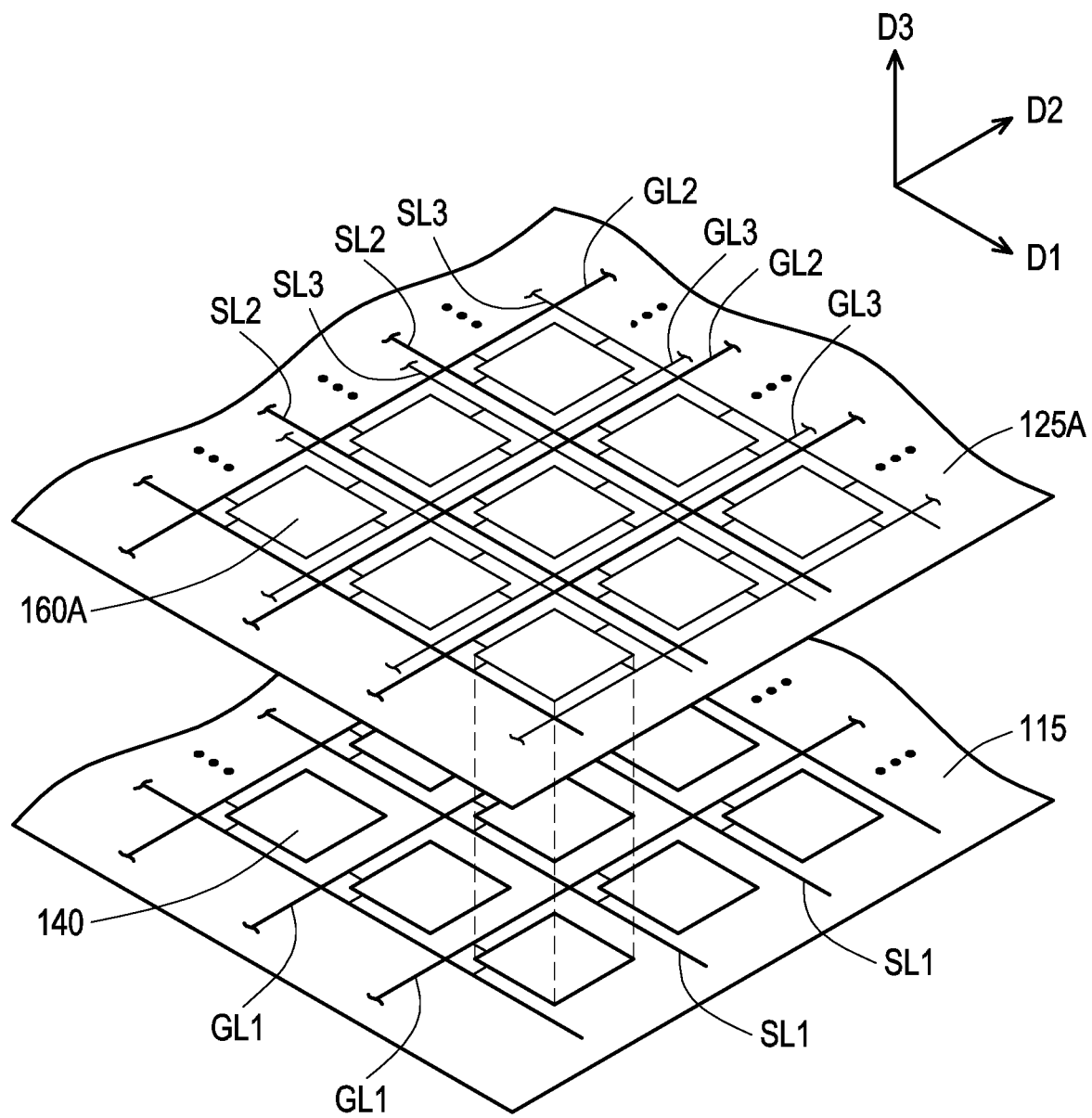
FIG. 7 is a schematic view of part of film layers of a microfluidic chip according to a second embodiment of the disclosure.
Figure 8:
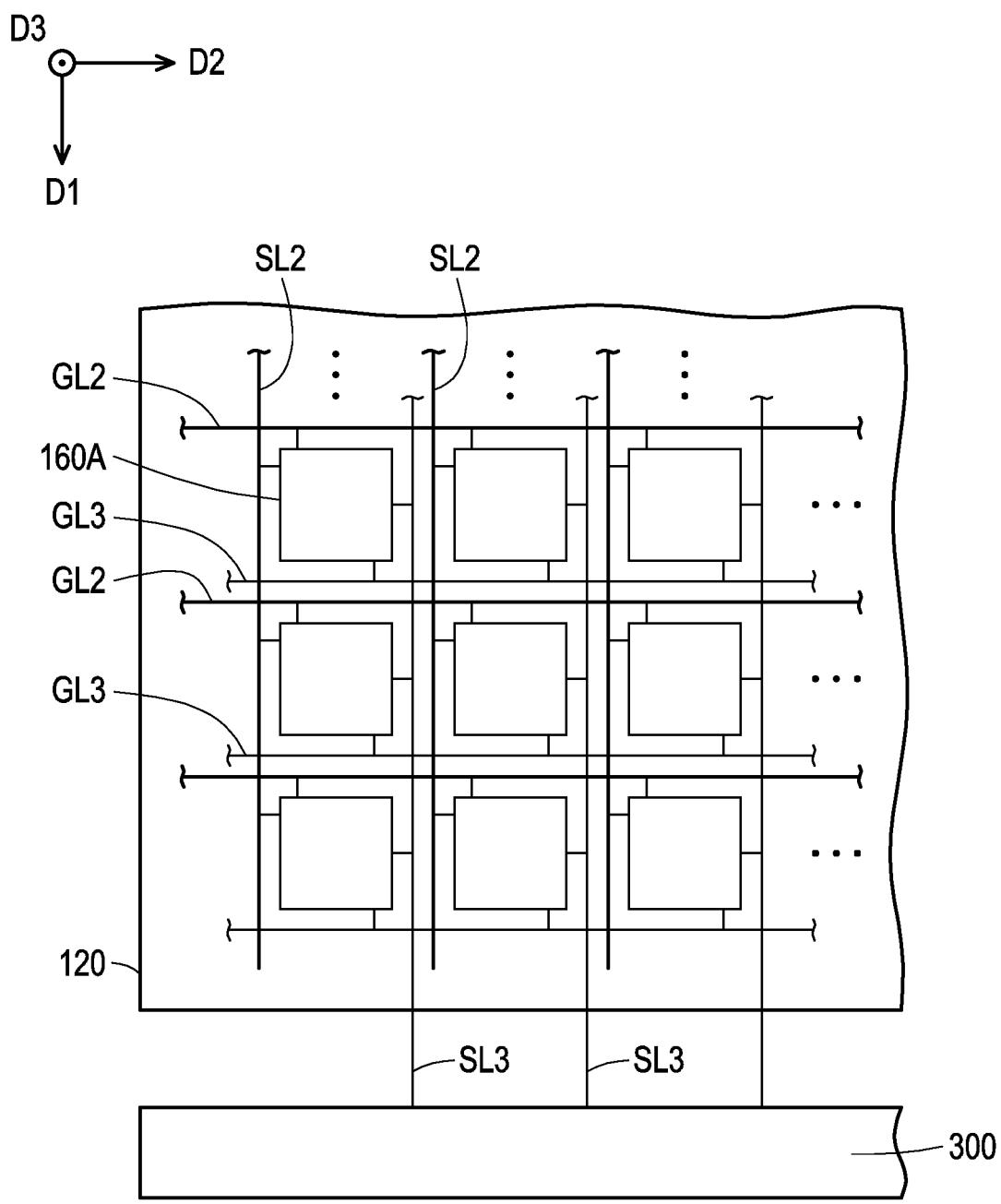
FIG. 8 is a schematic top view of the microfluidic chip according to the second embodiment of the disclosure.
Figure 9:
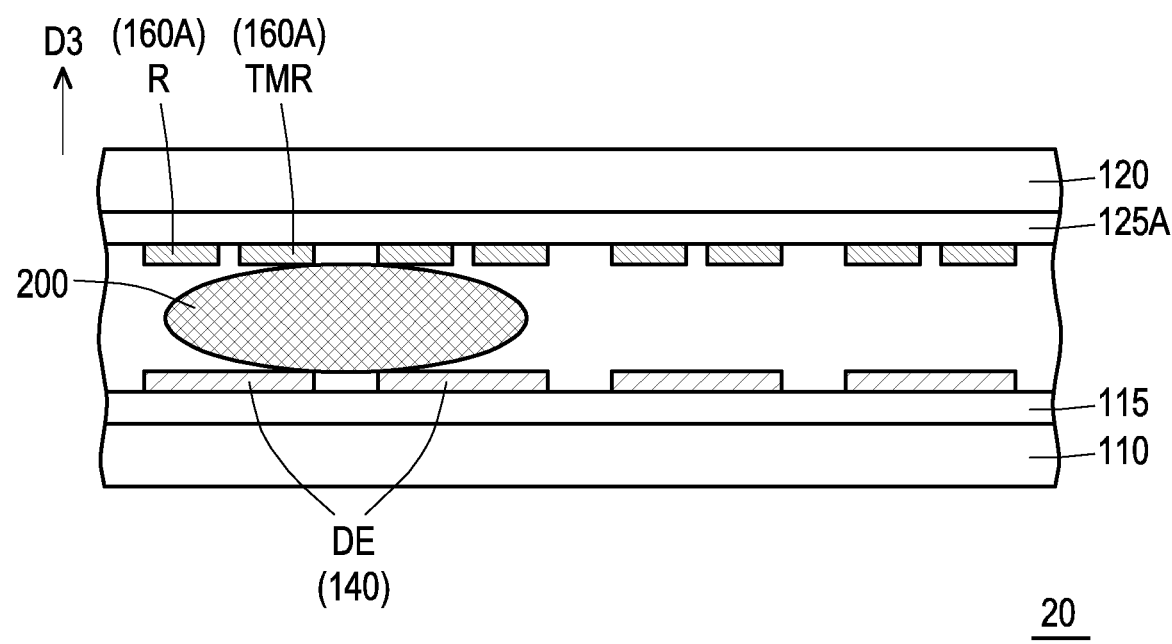
FIG. 9 is a schematic cross-sectional view of the microfluidic chip according to the second embodiment of the disclosure.
Figure 10A:
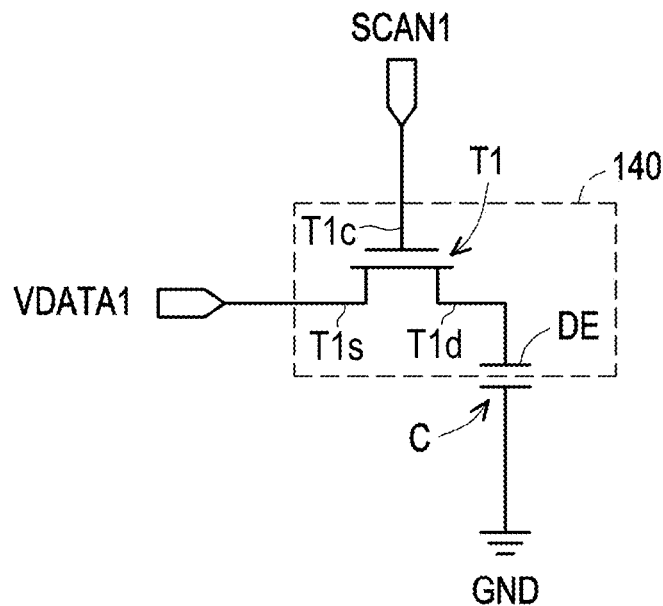
FIG. 10A and FIG. 10B are schematic circuit diagrams of an actuating unit and a heating unit in FIG. 7, respectively.
Figure 10B:
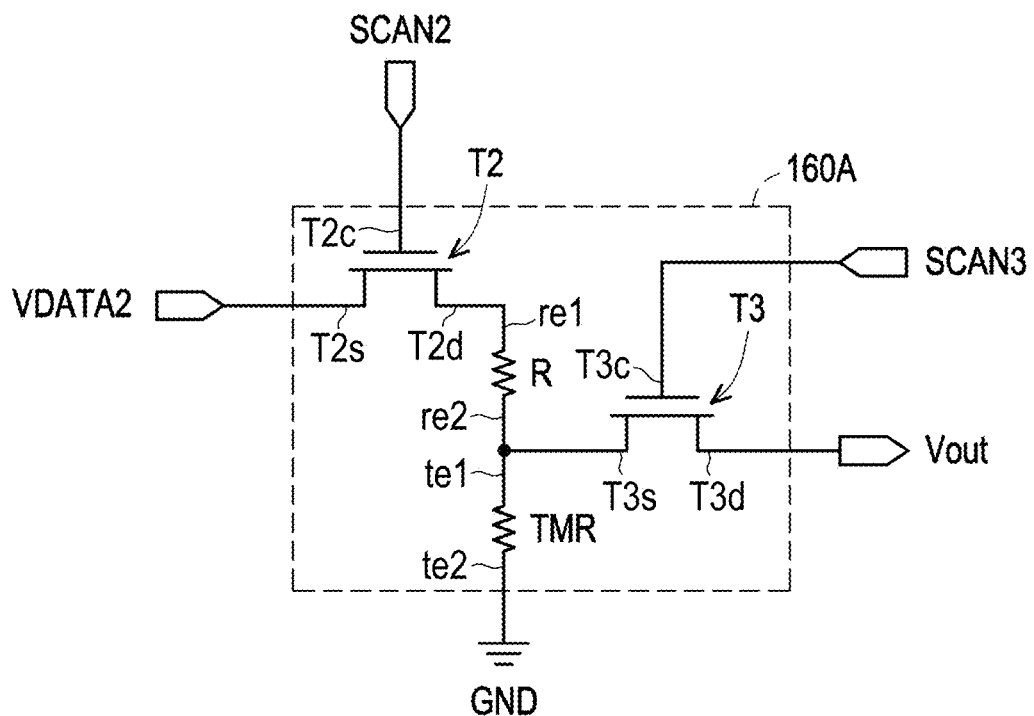

FIG. 7 is a schematic view of part of film layers of a microfluidic chip according to a second embodiment of the disclosure. FIG. 8 is a schematic top view of the microfluidic chip according to the second embodiment of the disclosure. FIG. 9 is a schematic cross-sectional view of the microfluidic chip according to the second embodiment of the disclosure. FIG. 10A and FIG. 10B are schematic circuit diagrams of an actuating unit and a heating unit in FIG. 7, respectively. FIG. 11A to FIG. 11E are schematic top views of an operation flow of the microfluidic chip in FIG. 9. FIG. 12A to FIG. 12E are schematic cross-sectional views of the operation flow of the microfluidic chip in FIG. 9. For clarity, FIG. 11A to FIG. 11E only show a second substrate 120 and a negative temperature coefficient thermistor TMR and a resistor R of a heating unit 160A in FIG. 9, and FIG. 8 only shows the film layer structure on the second substrate 120 in FIG. 9.

Referring to FIG. 7 to FIG. 10B, the main difference between a microfluidic chip 20 of this embodiment and the microfluidic chip 10 in FIG. 3 lies in that the design of the heating unit is different. Specifically, the heating unit 160A of the microfluidic chip 20 in this embodiment may further include a resistor R and a third active device T3, and a second driving circuit layer 125A may be further provided with a plurality of third scan lines GL3. The third scan lines GL3 may be arranged on the second substrate 120 along the direction D1 and extend in the direction D2. The third active device T3 is electrically connected to the negative temperature coefficient thermistor TMR, the resistor R, one of the third scan lines GL3, and one of the third signal lines SL3. In this embodiment, the resistance value of the resistor R is fixed.

Different from the heating unit 160 in FIG. 4B, in this embodiment, the drain terminal T2d of the second active device T2 is electrically connected to a first terminal re1 of the resistor R. A second terminal re2 of the resistor R is electrically connected to the first terminal te1 of the negative temperature coefficient thermistor TMR and a source terminal T3s of the third active device T3. The second terminal te2 of the negative temperature coefficient thermistor TMR is grounded. A control terminal T3c of the third active device T3 may receive a third scan signal SCAN3 from the third scan line GL3. A drain terminal T3d of the third active device T3 is electrically connected to one of the third signal lines SL3 to transmit a cross voltage Vout across the two terminals of the negative temperature coefficient thermistor TMR to the reading chip 300.

In this embodiment, the negative temperature coefficient thermistor TMR and the resistor R of any one of the plurality of heating units 160A overlap with the driving electrode DE of the corresponding actuating unit 140 in the stacking direction (e.g., the direction D3) of the two substrates (as shown in FIG. 9).

Figure 11A:
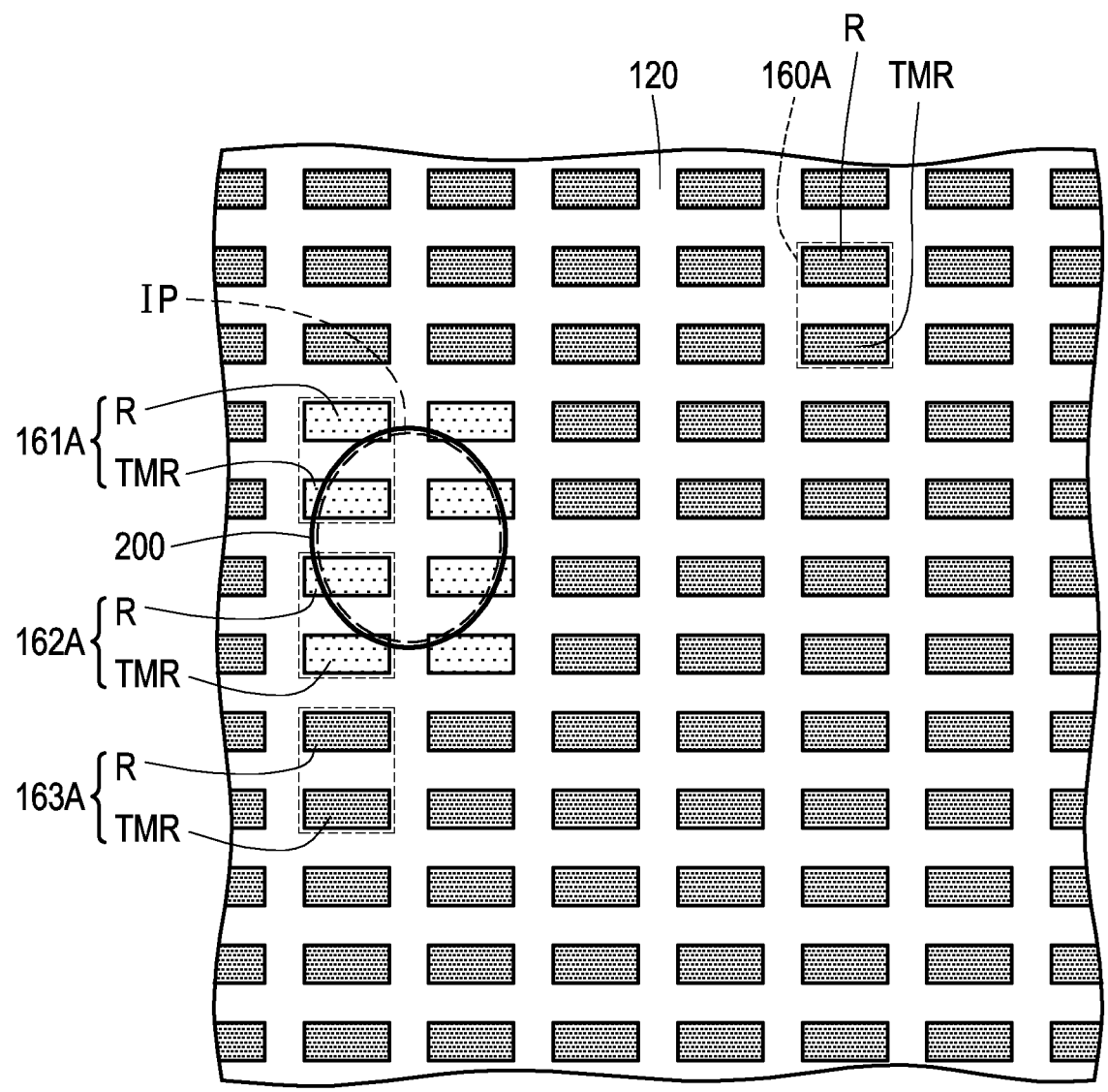
FIG. 11A to FIG. 11E are schematic top views of an operation flow of the microfluidic chip in FIG. 9.
Figure 12A:
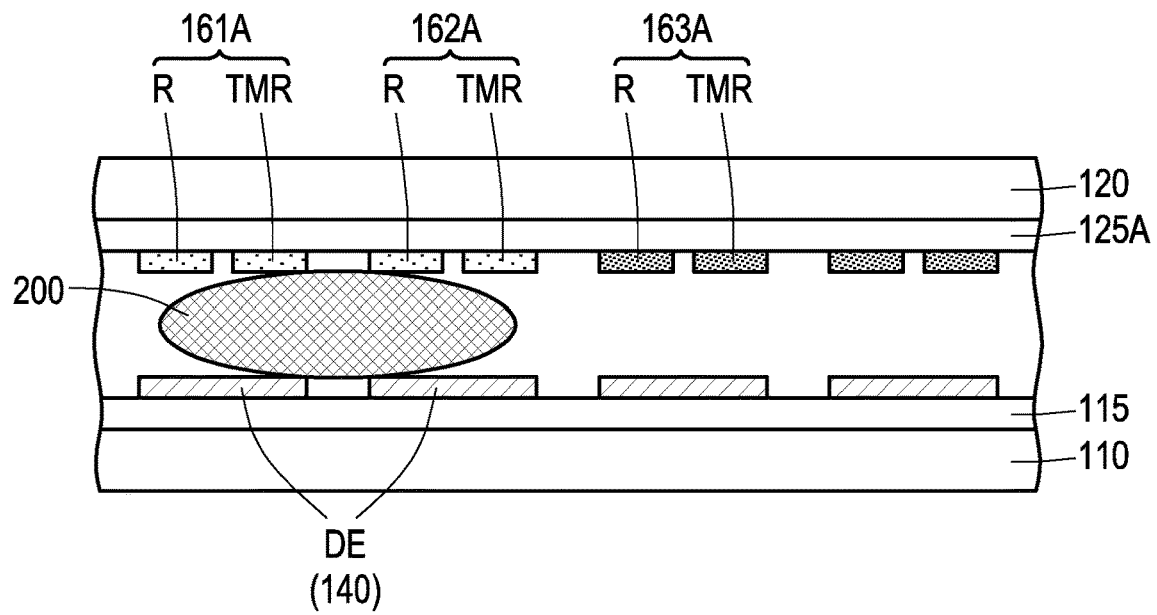
FIG. 12A to FIG. 12E are schematic cross-sectional views of the operation flow of the microfluidic chip in FIG. 9.

A method for using the microfluidic chip 20 will be exemplarily described below. Referring to FIG. 10B, FIG. 11A, and FIG. 12A, first, all the heating units 160A are enabled to perform a first heating step. For example, the second active devices T2 of the plurality of heating units 160A connected to different second scan lines GL2 may be turned on sequentially, so that a current flows through the negative temperature coefficient thermistor TMR and the resistor R to generate heat for performing heating. Next, the cross voltages Vout across the negative temperature coefficient thermistors TMR of the heating units 160A are compared.

The resistance value of the negative temperature coefficient thermistor TMR decreases as the temperature of the negative temperature coefficient thermistor TMR increases, and when all the heating units 160A perform heating with a substantially same setting, the temperatures of the negative temperature coefficient thermistors TMR of the heating units 160A (e.g., the heating unit 161A and the heating unit 162A) in contact with the microfluid 200 are lower than those of other heating units 160A (e.g., the heating unit 163A) that are not in contact with the microfluid 200. Therefore, the resistance values of the respective negative temperature coefficient thermistors TMR of the heating unit 161A and the heating unit 162A are higher than the resistance value of the negative temperature coefficient thermistor TMR of the heating unit 163A.

In other words, the cross voltages Vout across the respective negative temperature coefficient thermistors TMR of the heating unit 161A and the heating unit 162A are greater than the cross voltage Vout across the negative temperature coefficient thermistor TMR of the heating unit 163A. Therefore, the initial position IP of the microfluid 200 may be obtained by transmitting the cross voltages Vout across the negative temperature coefficient thermistors TMR of the heating units 160A to the reading chip 300 for interpretation. For example, the step of interpreting the cross voltages Vout includes confirming whether the cross voltage across the negative temperature coefficient thermistor TMR of each heating unit 160A is greater than a predetermined voltage value, but the disclosure is not limited thereto. In other embodiments, the step of interpreting the cross voltages may also include confirming whether a cross voltage difference between two negative temperature coefficient thermistors TMR of any two adjacent heating units 160A is greater than a predetermined value. Alternatively, the step may include confirming whether a difference between the cross voltage across the negative temperature coefficient thermistor TMR of each heating unit 160A and an average cross voltage across the negative temperature coefficient thermistor TMR of all the heating units 160A is greater than a predetermined value.

Figure 11B:
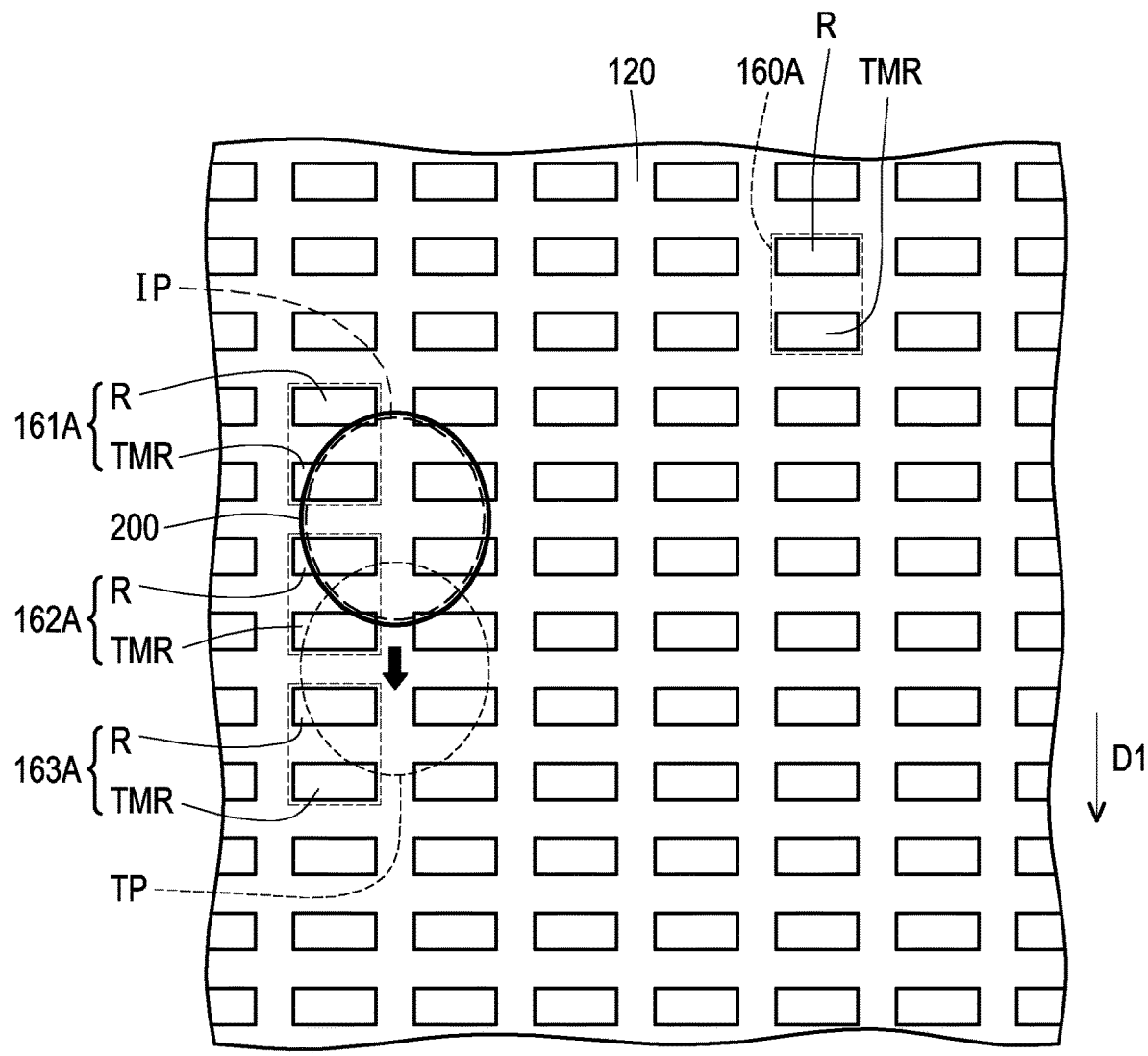
Figure 11C:
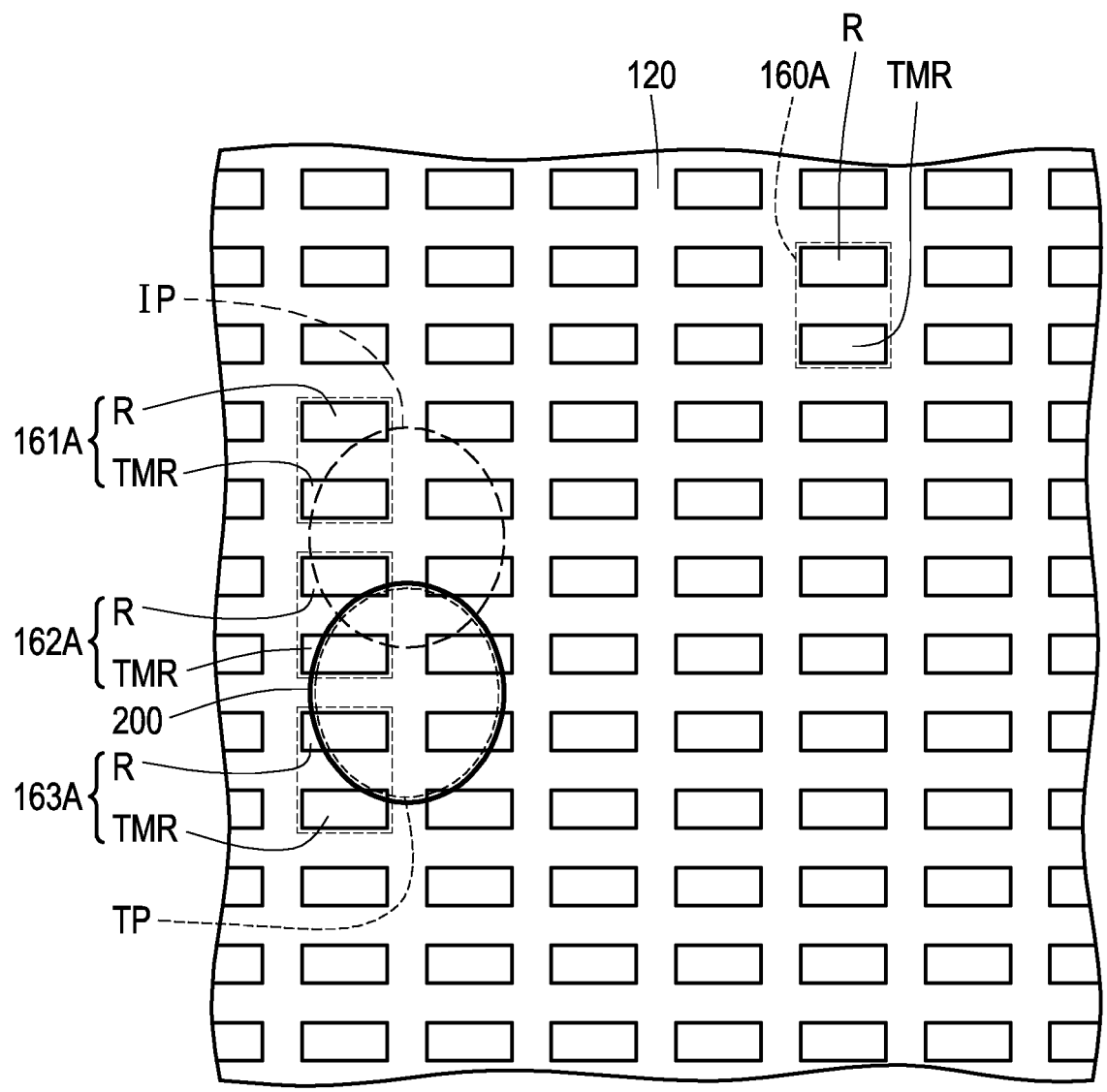
Figure 12B:
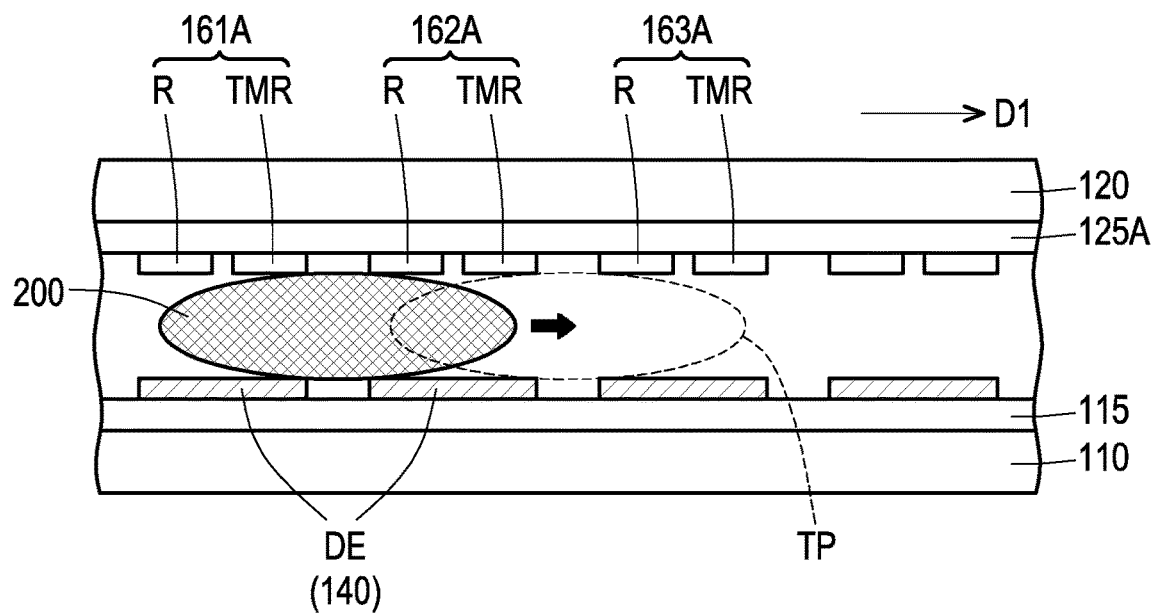
Figure 12C:
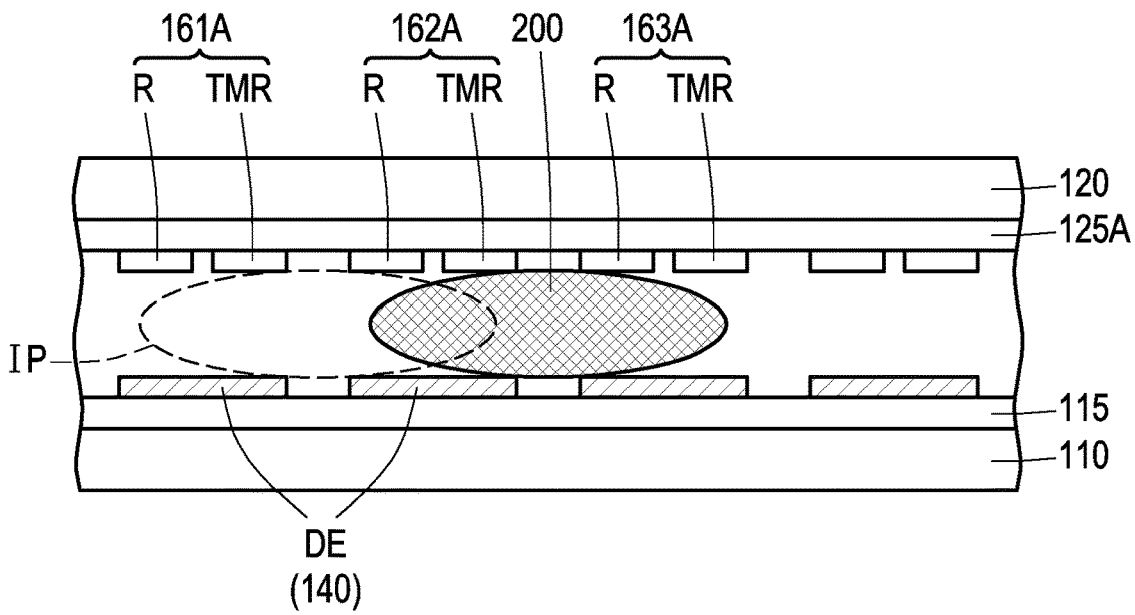

Referring to FIG. 11B and FIG. 12B, after obtaining the initial position IP of the microfluid 200 and before moving the microfluid 200, all the heating units 160A are disabled. That is, in this embodiment, after all the heating units 160A are disabled, at least two adjacent actuating units 140 are then enabled, so that the microfluid 200 moves from the initial position IP to the target position TP (as shown in FIG. 11C and FIG. 12C). For example, the target position TP in this embodiment is a position overlapping with the heating unit 162A and the heating unit 163A, and the microfluid 200 moves from the initial position IP to the target position TP along the direction D1.

Figure 11D:
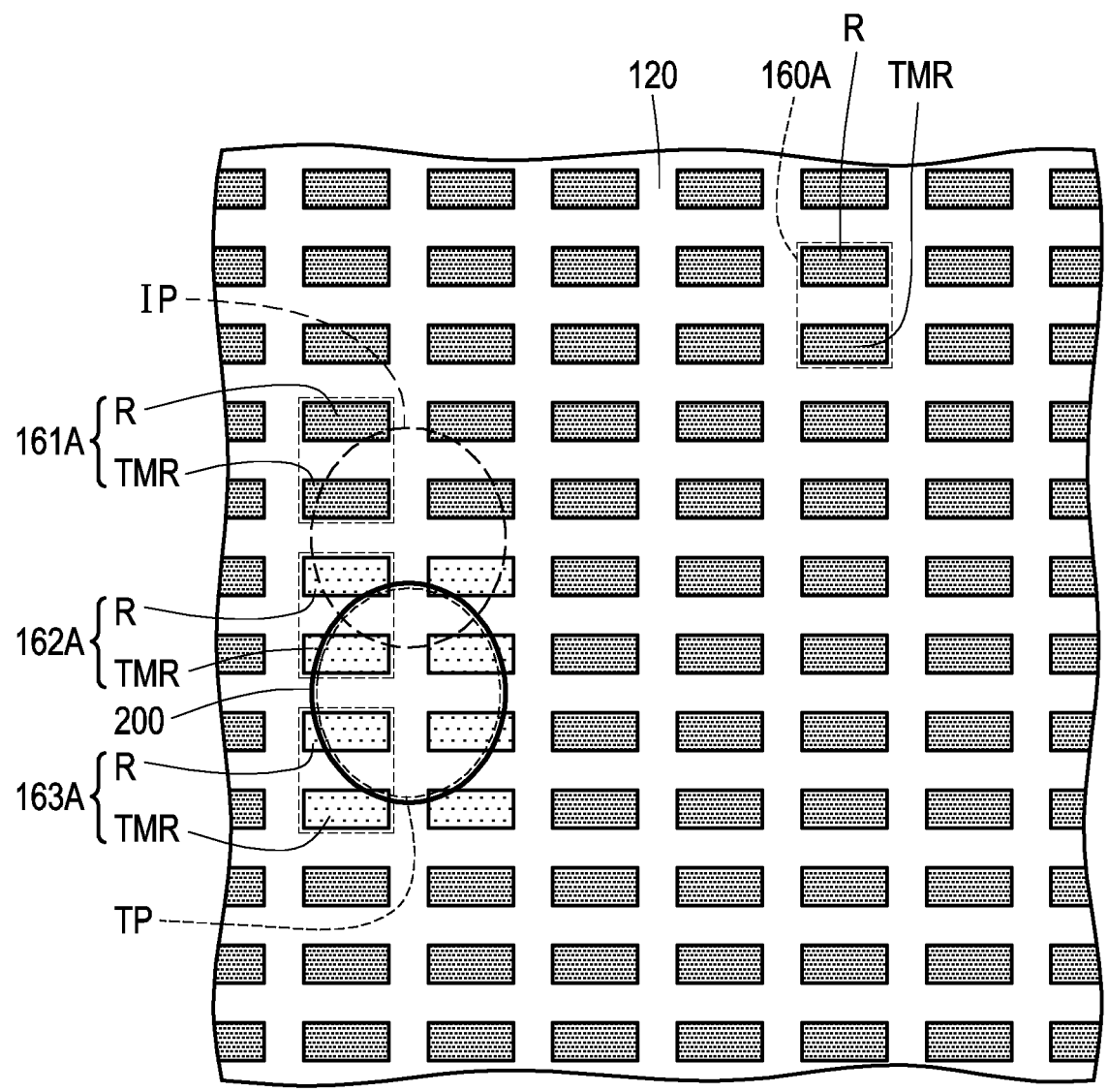
Figure 11E:
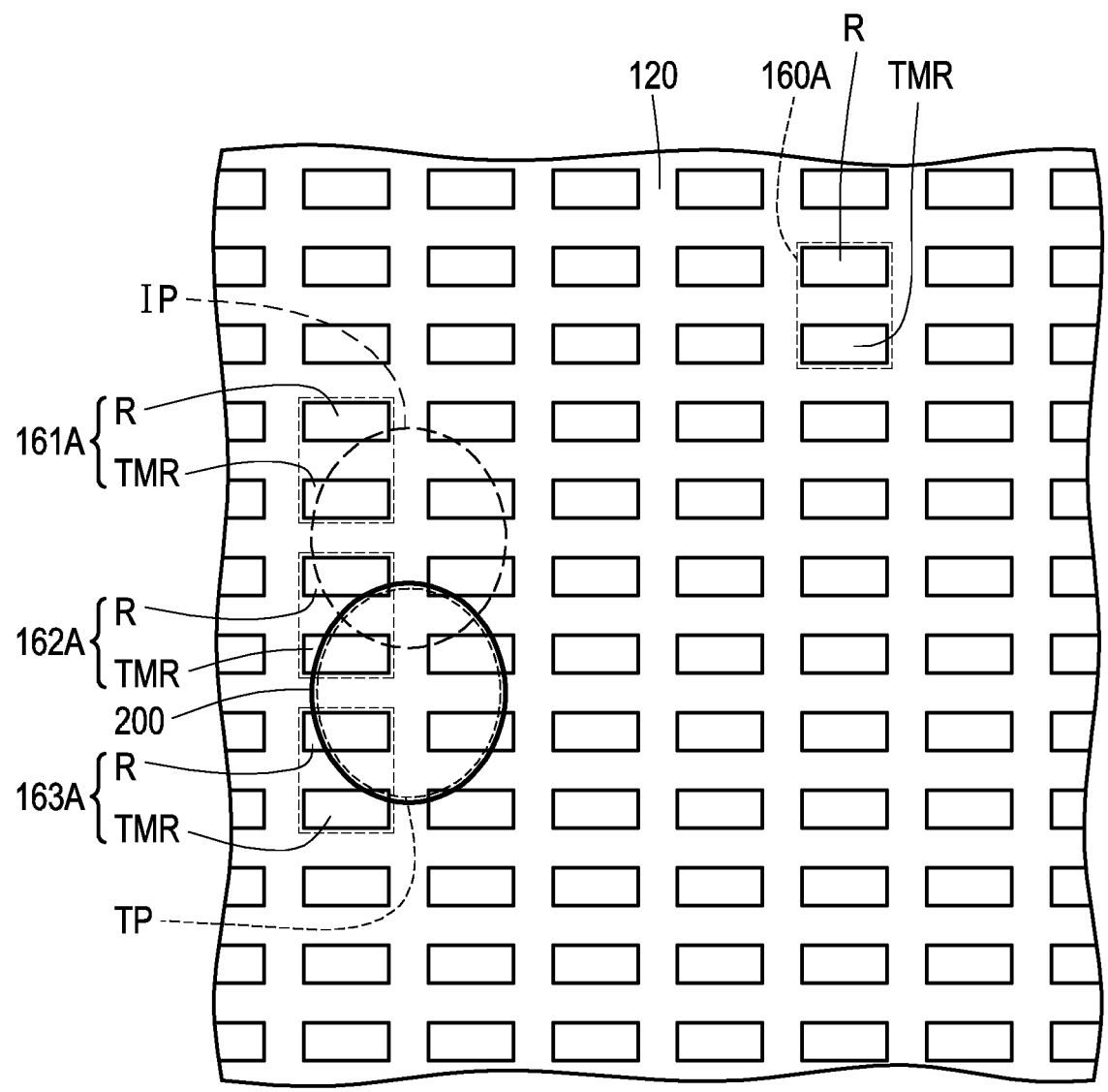
Figure 12D:
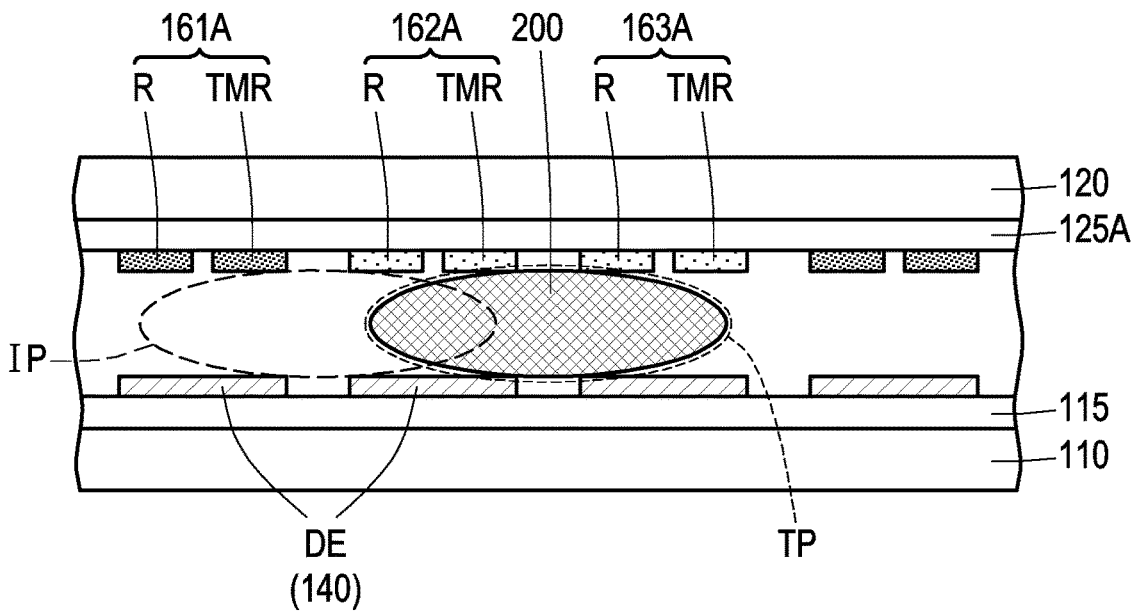
Figure 12E:
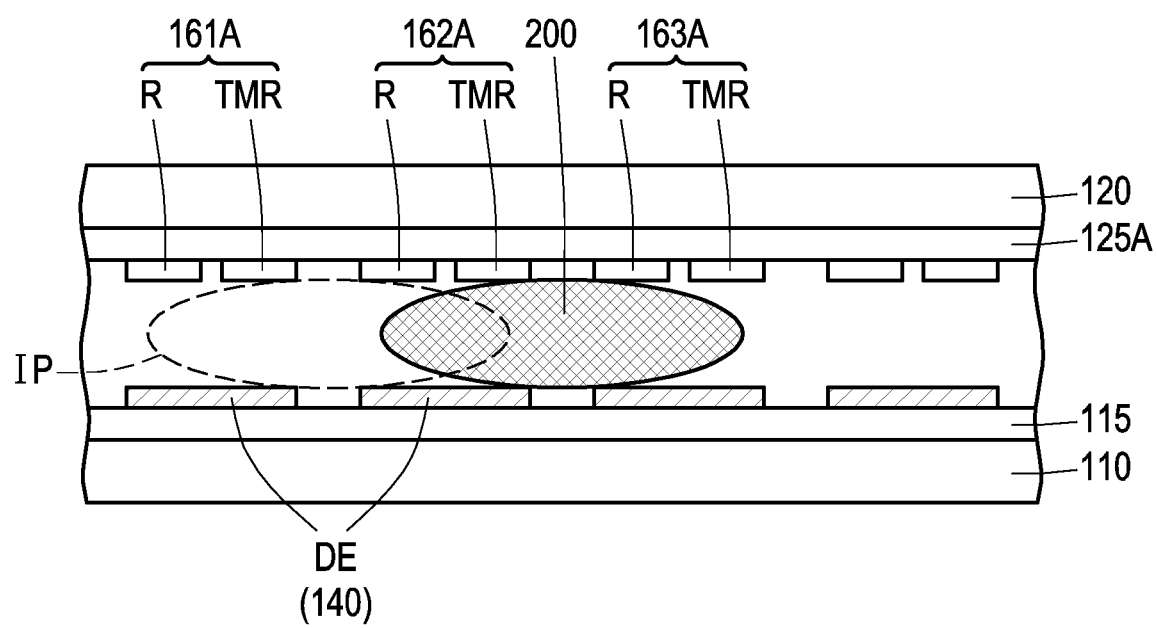

Referring to FIG. 11D and FIG. 12D, when the microfluid 200 stops moving, all the heating units 160A are enabled to perform a second heating step. For example, the second active devices T2 (as shown in FIG. 8 and FIG. 10B) of the plurality of heating units 160A connected to different second scan lines GL2 may be turned on sequentially, so that a current flows through the negative temperature coefficient thermistor TMR and the resistor R to generate heat for performing heating. Next, the cross voltages Vout across the negative temperature coefficient thermistors TMR of the heating units 160A are compared to obtain the position of the microfluid 200 and confirm whether it is the target position TP. Since the principle of obtaining the target position TP herein is the same as the principle of obtaining the initial position IP described above, reference may be made to the relevant paragraphs above for detailed descriptions, which shall not be repeated herein. After obtaining the target position TP of the microfluid 200, all the heating units 160A are disabled, as shown in FIG. 11E and FIG. 12E.

Different from the operation method of the embodiment above, in this embodiment, the detection of the position of the microfluid 200 is carried out by global heating and global cooling (i.e., all the heating units 160A are enabled or disabled at the same time). With the operation method described above, in addition to heating the microfluid 200, the heating units 160A may also be used to detect the position of the microfluid 200. That is, the position of the microfluid 200 can be obtained without additionally providing sensors, so the structural design of the microfluidic chip 20 can be simplified.

In particular, the method for using the microfluidic chip 20 is not limited to the descriptions above. Other methods for using the microfluidic chip 20 will be exemplarily described below.

FIG. 13A to FIG. 13E are schematic top views of another operation process of the microfluidic chip in FIG. 9. FIG. 14A to FIG. 14E are schematic cross-sectional views of another operation process of the microfluidic chip in FIG. 9. For clarity, FIG. 13A to FIG. 13E only show the film layer structure on the second substrate 120 in FIG. 14A to FIG. 14E.

Figure 13A:
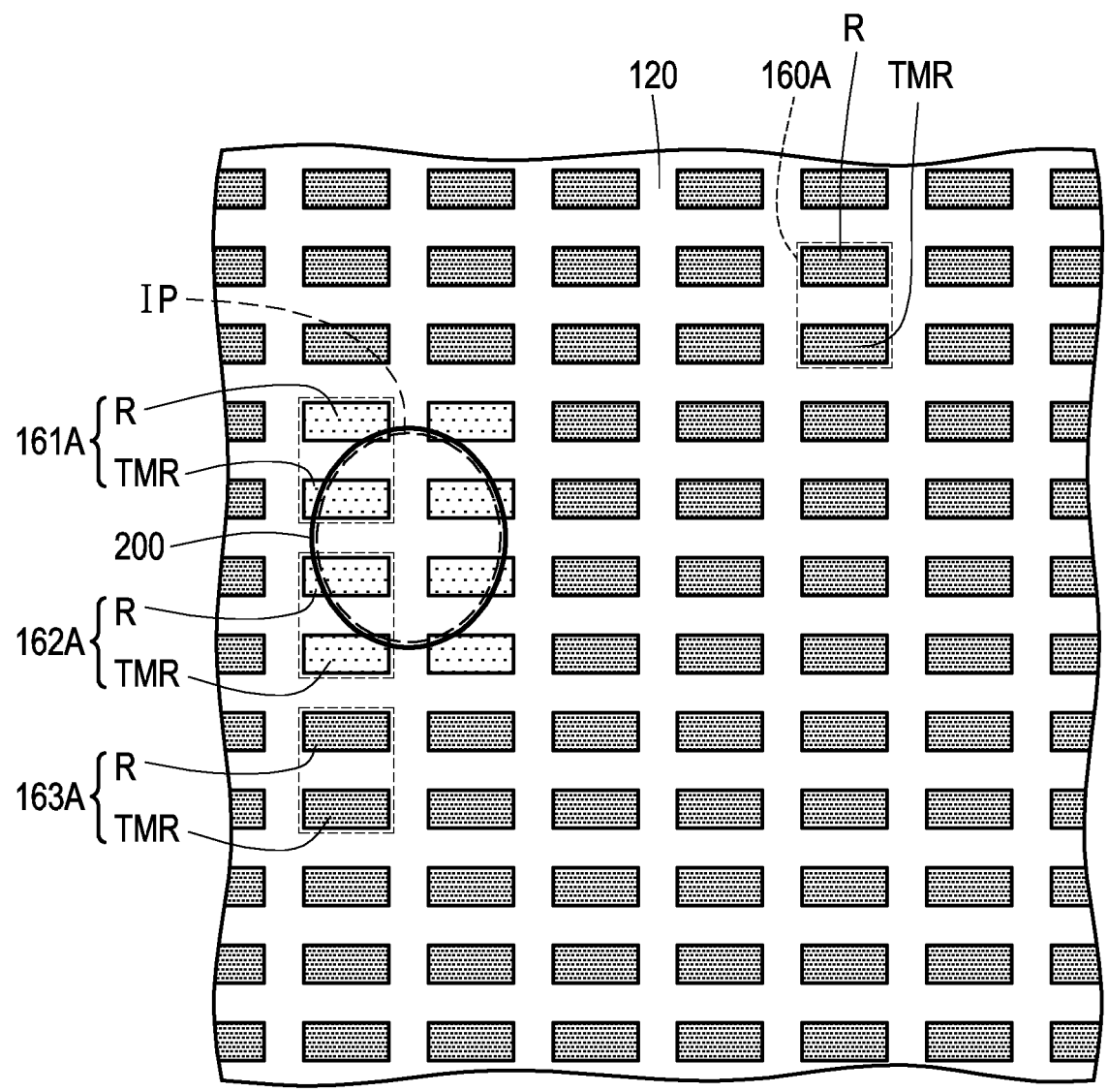
FIG. 13A to FIG. 13E are schematic top views of another operation process of the microfluidic chip in FIG. 9.
Figure 14A:
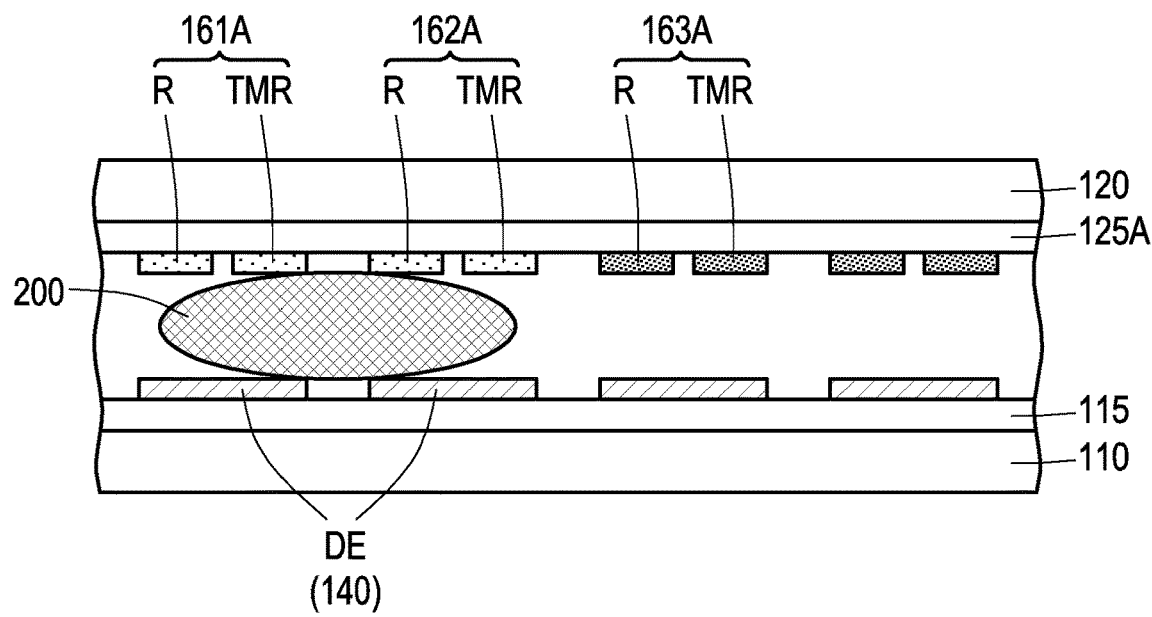
FIG. 14A to FIG. 14E are schematic cross-sectional views of another operation process of the microfluidic chip in FIG. 9.

Referring to FIG. 10B, FIG. 13A, and FIG. 14A, first, all the heating units 160A are enabled to perform a first heating step. For example, the second active devices T2 of the plurality of heating units 160A connected to different second scan lines GL2 may be turned on sequentially, so that a current flows through the negative temperature coefficient thermistor TMR and the resistor R to generate heat for performing heating. Next, cross voltages Vout across the negative temperature coefficient thermistors TMR of the heating units 160A are compared to obtain the initial position IP of the microfluid 200. Since the principle of obtaining the initial position IP herein is the same as the principle of obtaining the initial position IP in the embodiments above, reference may be made to the relevant paragraphs of the embodiments above for detailed descriptions, which shall not be repeated herein.

Figure 13B:
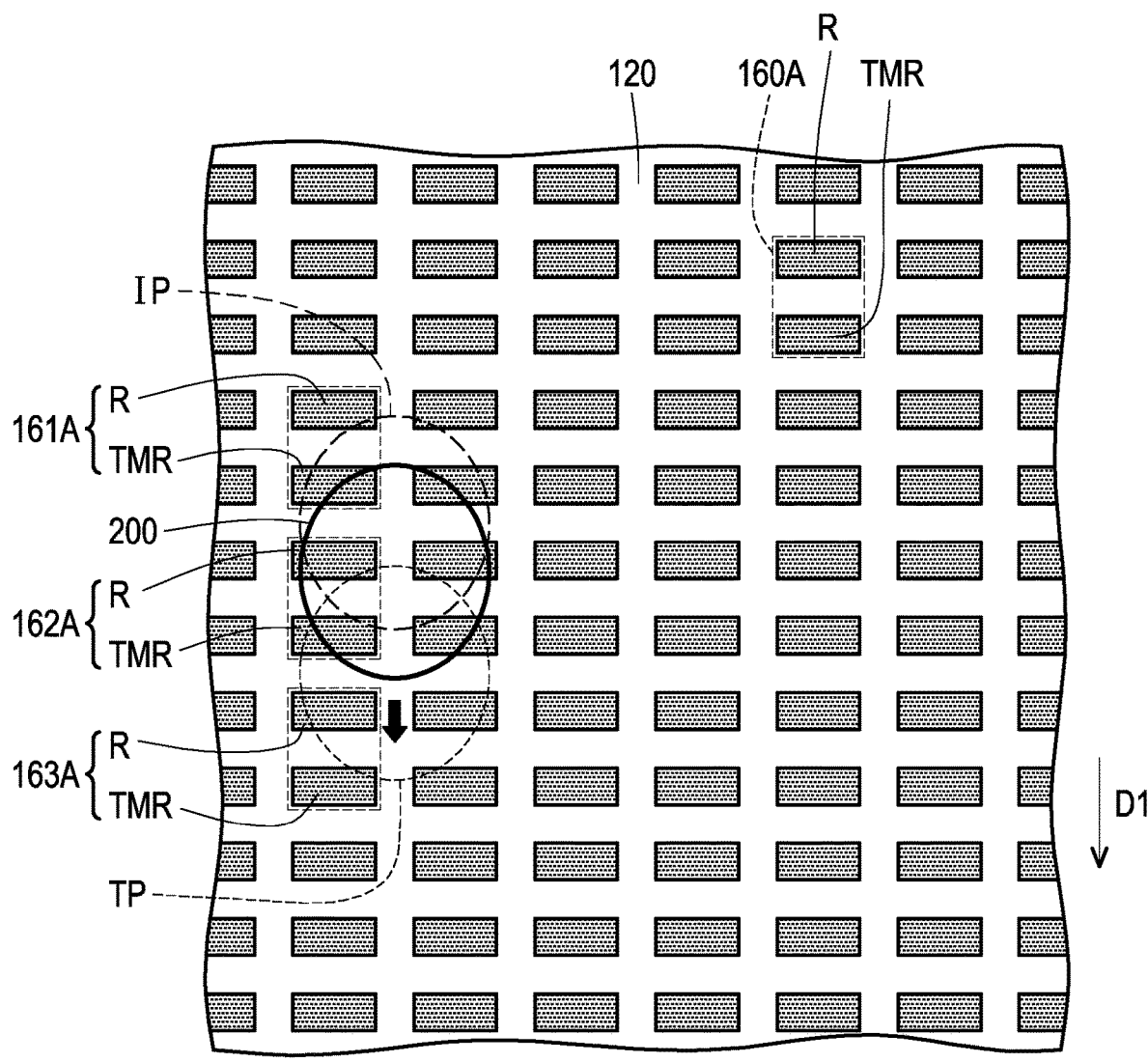
Figure 14B:
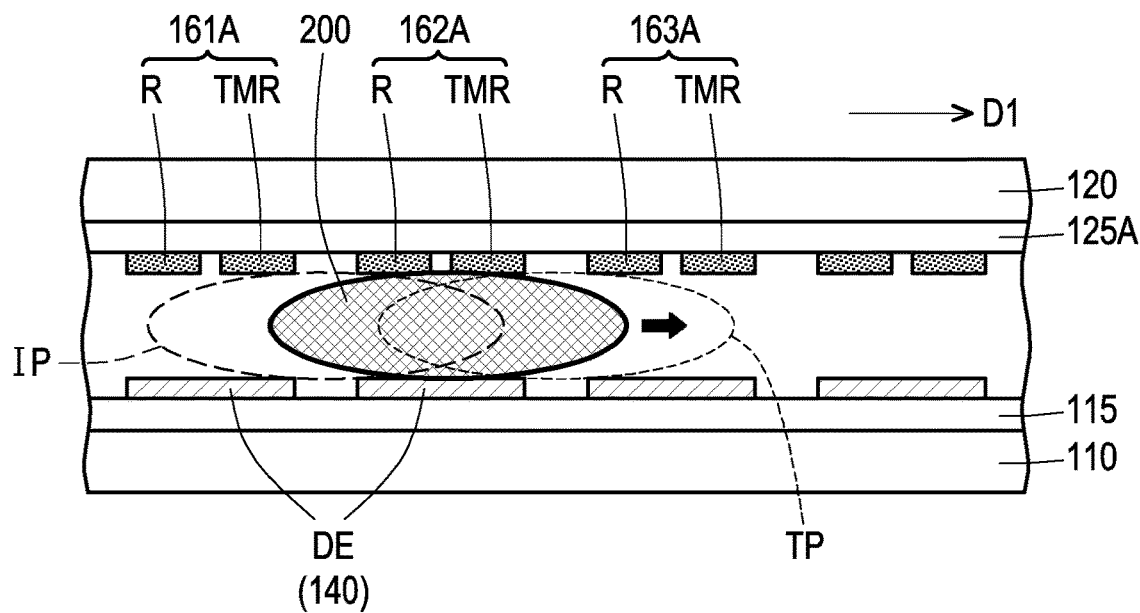

Referring to FIG. 13B and FIG. 14B, after obtaining the initial position IP, part of the actuating units 140 are enabled, so that the microfluid 200 moves from the initial position IP to a set target position TP. For example, the actuating units 140 overlapping with the microfluid 200 at the initial position IP and the actuating units 140 that are adjacent to but do not overlap with the microfluid 200 at the initial position IP may be enabled. Since the principle of moving the microfluid 200 is similar to that in the embodiment shown in FIG. 3, reference may be made to the relevant paragraphs of the embodiments above for detailed descriptions, which shall not be repeated herein.

Figure 13C:
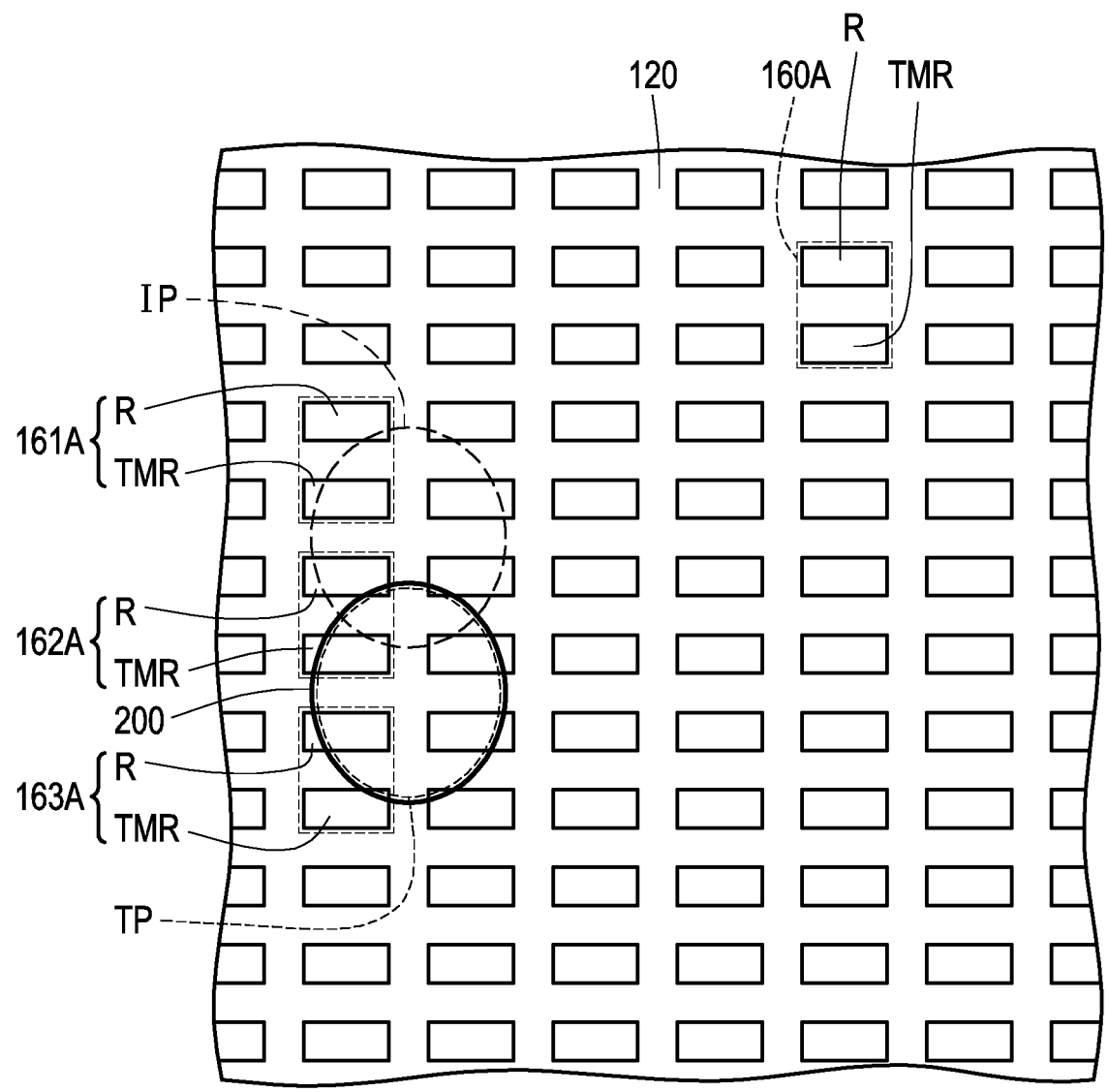
Figure 13D:
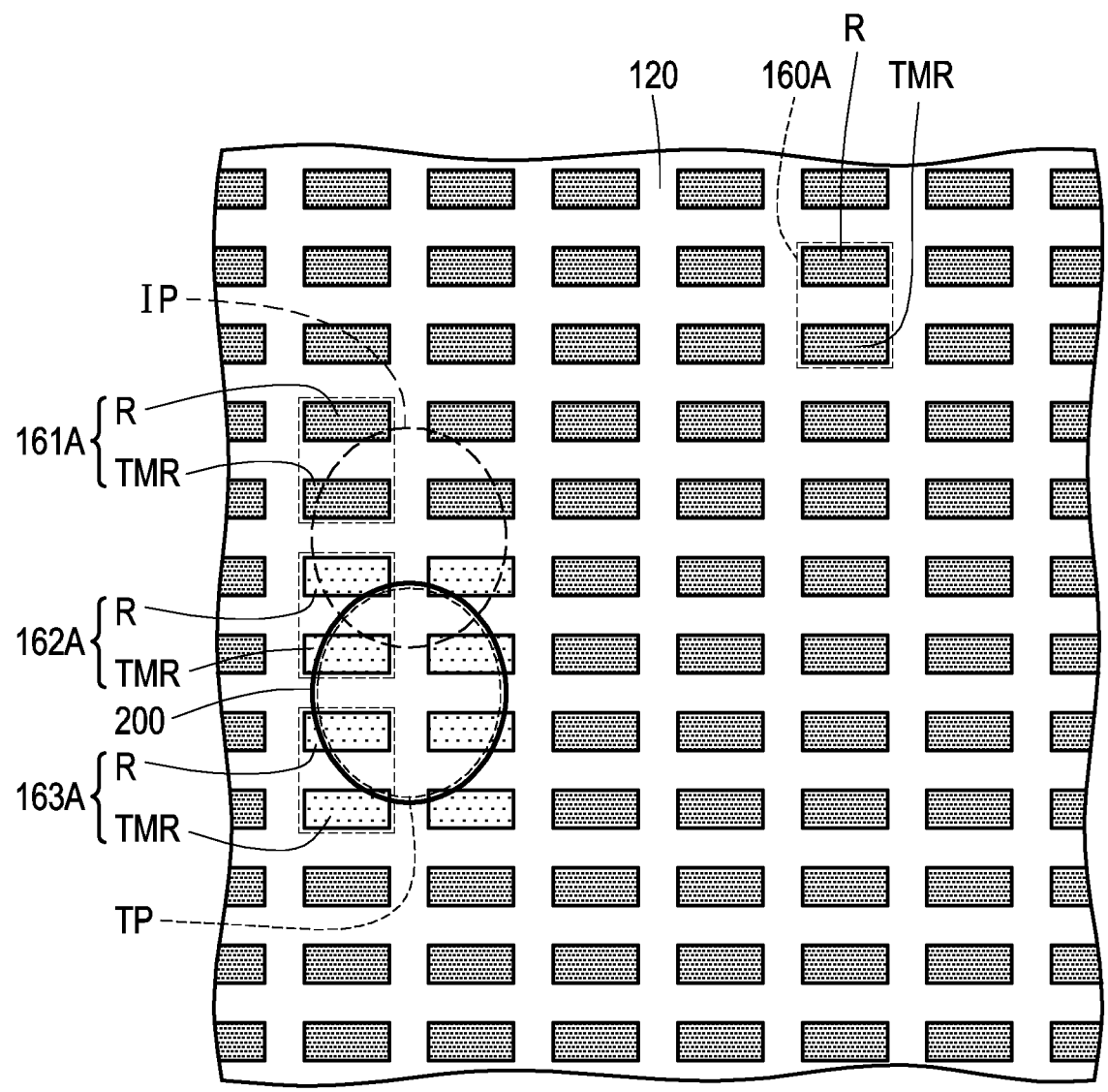
Figure 14C:
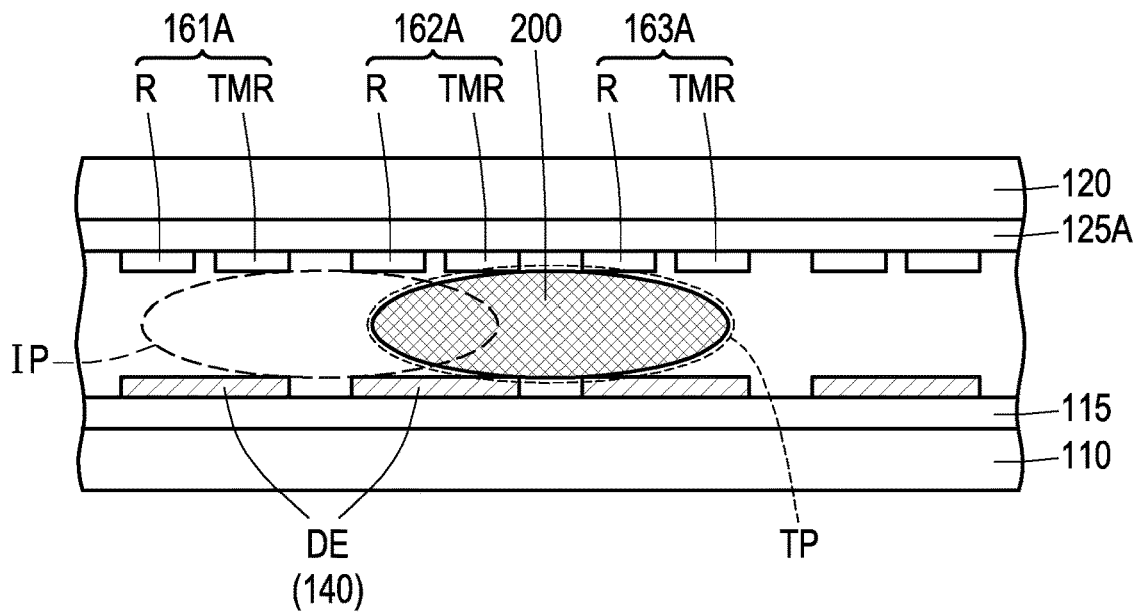
Figure 14D:
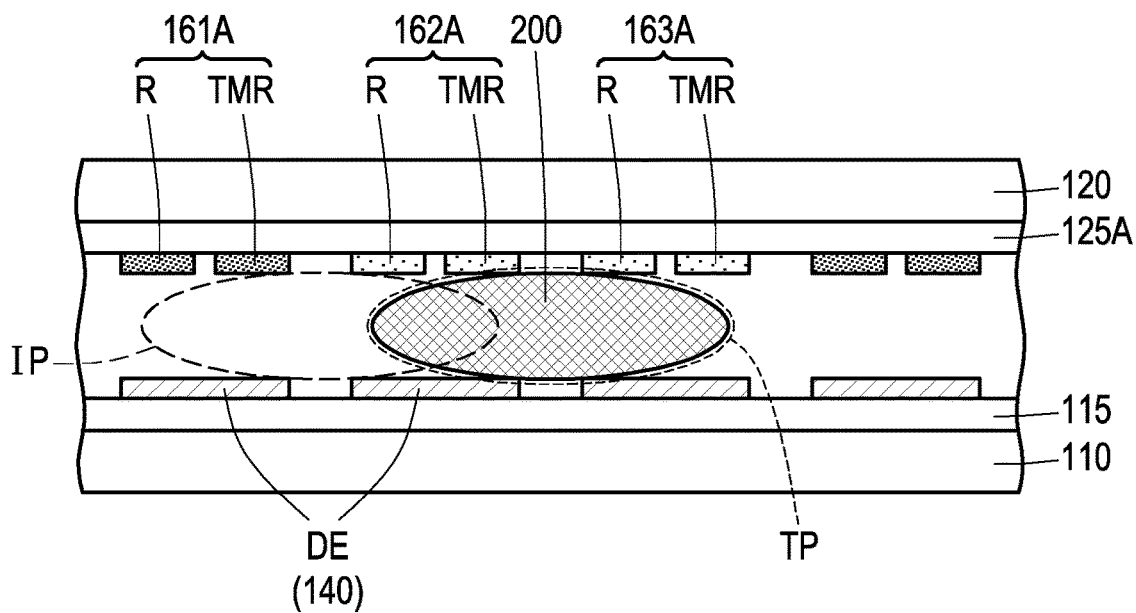

After the microfluid 200 moves to the target position TP, all the heating units 160A are disabled in a first time interval, as shown in FIG. 13C and FIG. 14C. Then, all the heating units 160A are enabled in a second time interval to perform a second heating step, as shown in FIG. 13D and FIG. 14D. For example, the second active devices T2 (as shown in FIG. 8 and FIG. 10B) of the plurality of heating units 160A connected to different second scan lines GL2 may be turned on sequentially, so that a current flows through the negative temperature coefficient thermistor TMR and the resistor R to generate heat for performing heating.

Figure 13E:
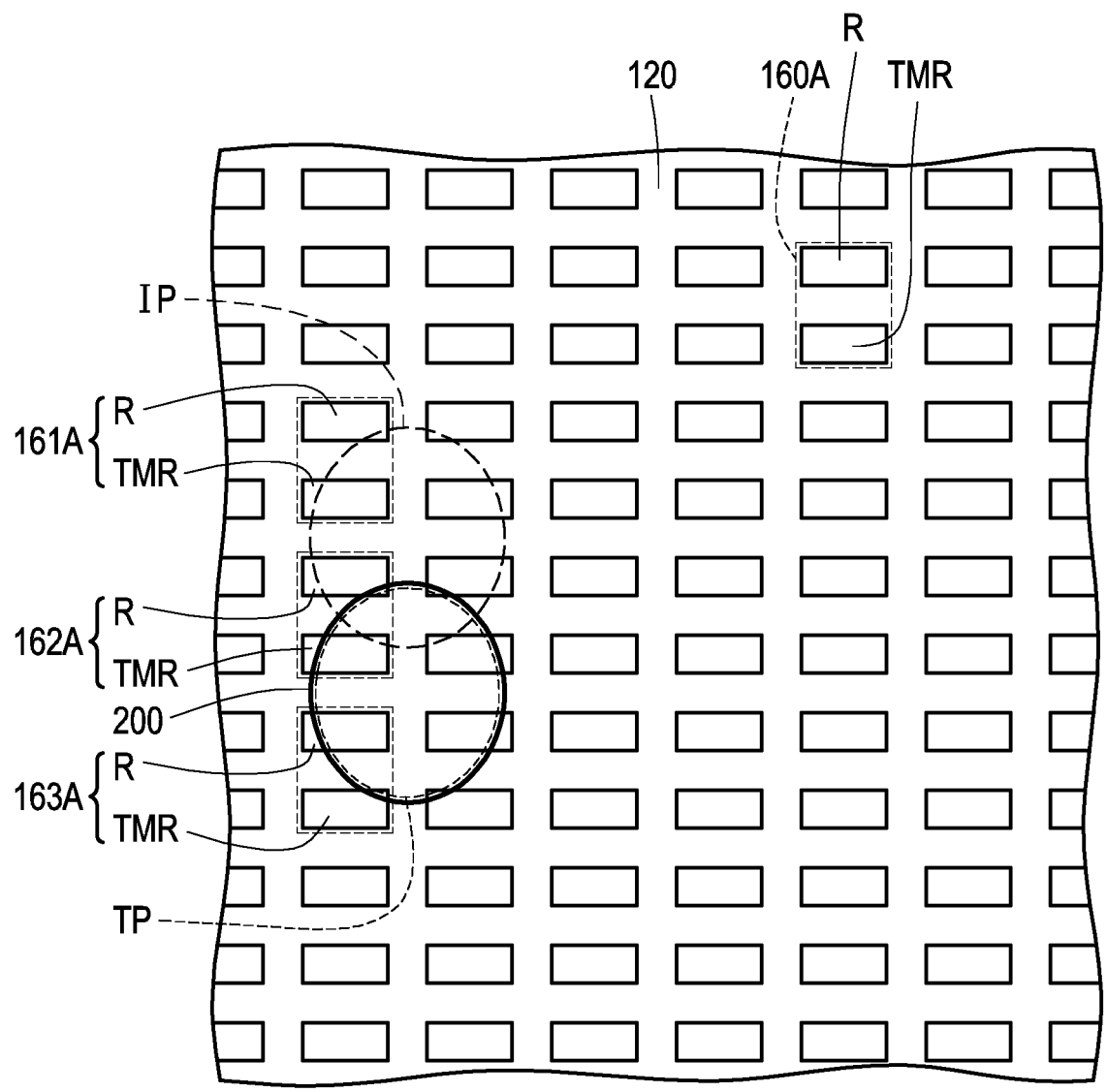
Figure 14E:
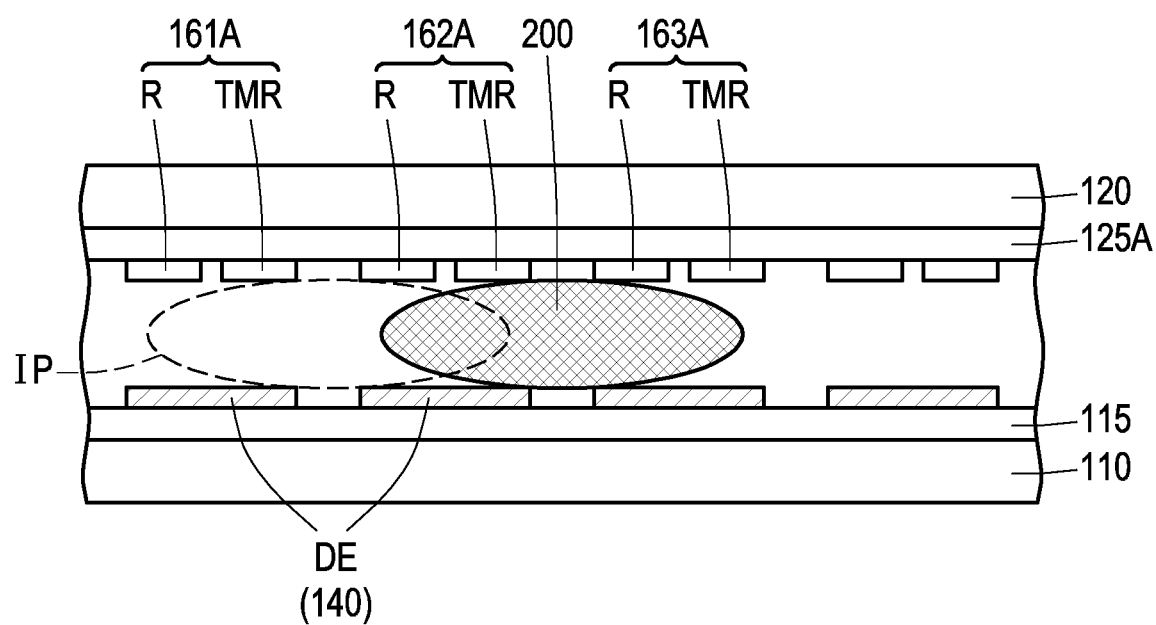

Next, cross voltages Vout across the negative temperature coefficient thermistors TMR of the heating units 160A are compared to obtain the position of the microfluid 200 and confirm whether it is the target position TP. Since the principle of obtaining the target position TP herein is the same as the principle of obtaining the initial position IP described above, reference may be made to the relevant paragraphs above for detailed descriptions, which shall not be repeated herein. After obtaining the target position TP of the microfluid 200, all the heating units 160A are disabled, as shown in FIG. 13E and FIG. 14E.

Different from the operation method of FIG. 12A to FIG. 12C, during the movement of the microfluid 200 to the target position TP in this embodiment, all the heating units 160A remain in the enabled state.

FIG. 15A to FIG. 15E are schematic top views of still another operation process of the microfluidic chip in FIG. 9. FIG. 16A to FIG. 16E are schematic cross-sectional views of still another operation process of the microfluidic chip in FIG. 9. For clarity, FIG. 15A to FIG. 15E only show the film layer structure on the second substrate 120 in FIG. 16A to FIG. 16E.

Figure 15A:
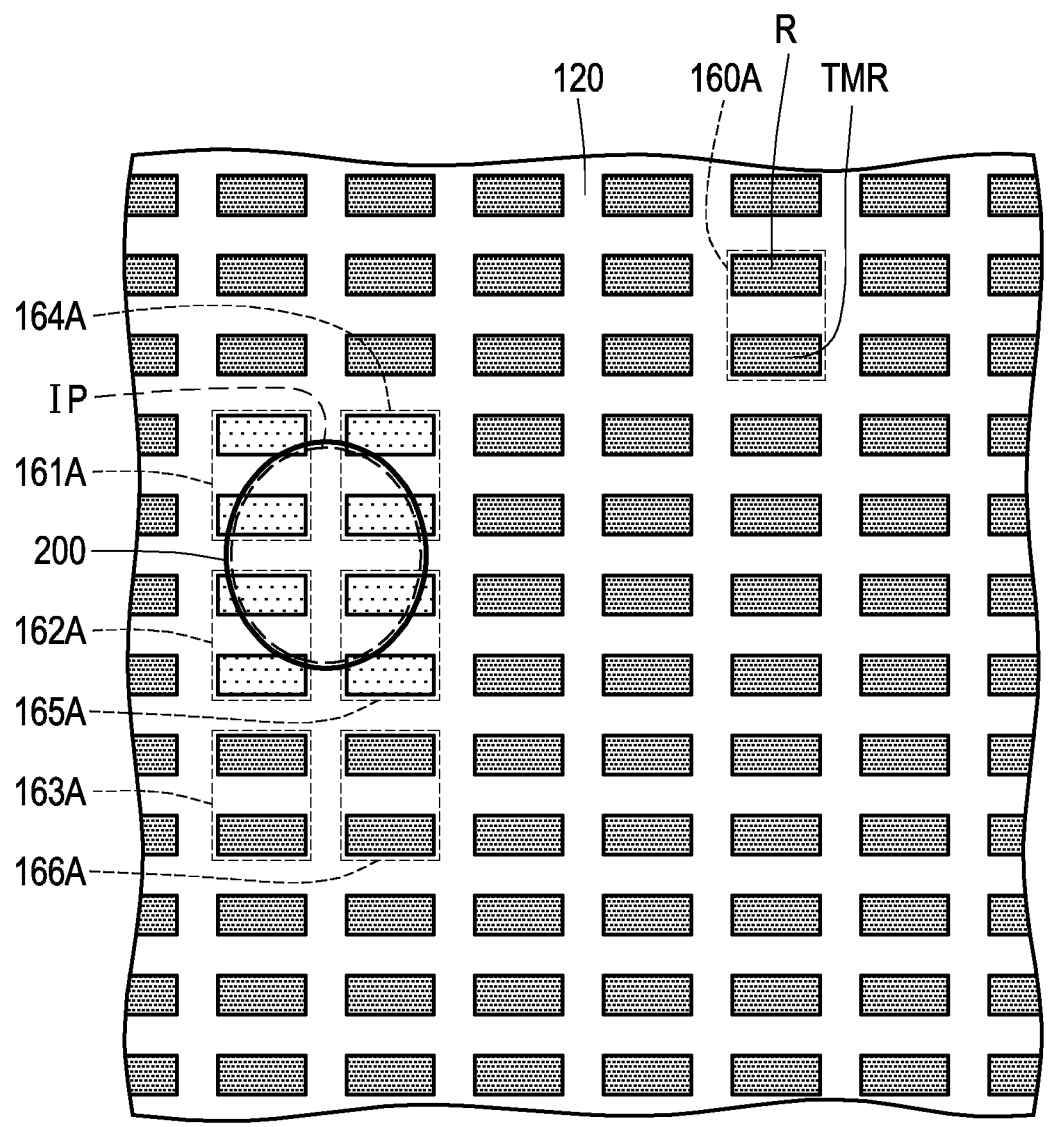
FIG. 15A to FIG. 15E are schematic top views of still another operation process of the microfluidic chip in FIG. 9.
Figure 16A:
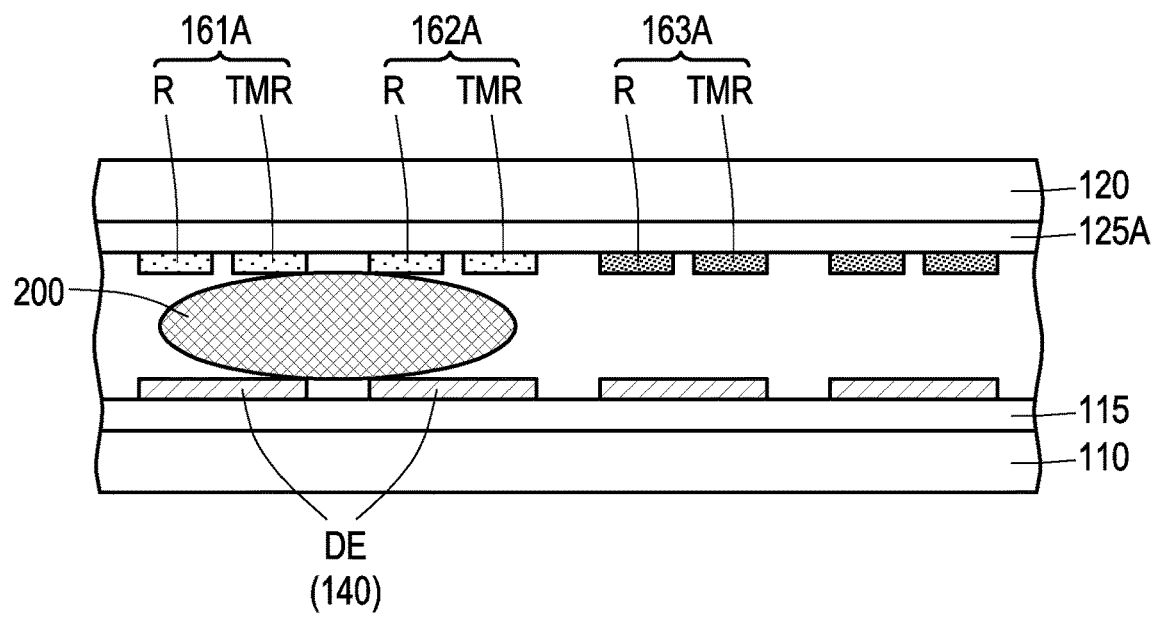
FIG. 16A to FIG. 16E are schematic cross-sectional views of still another operation process of the microfluidic chip in FIG. 9.

Referring to FIG. 10B, FIG. 15A, and FIG. 16A, first, all the heating units 160A are enabled to perform a first heating step. For example, the second active devices T2 of the plurality of heating units 160A connected to different second scan lines GL2 may be turned on sequentially, so that a current flows through the negative temperature coefficient thermistor TMR and the resistor R to generate heat for performing heating. Next, cross voltages Vout across the negative temperature coefficient thermistors TMR of the heating units 160A are compared to obtain the initial position IP of the microfluid 200. Since the principle of obtaining the initial position IP herein is the same as the principle of obtaining the initial position IP in the embodiments above, reference may be made to the relevant paragraphs of the embodiments above for detailed descriptions, which shall not be repeated herein.

Figure 15B:
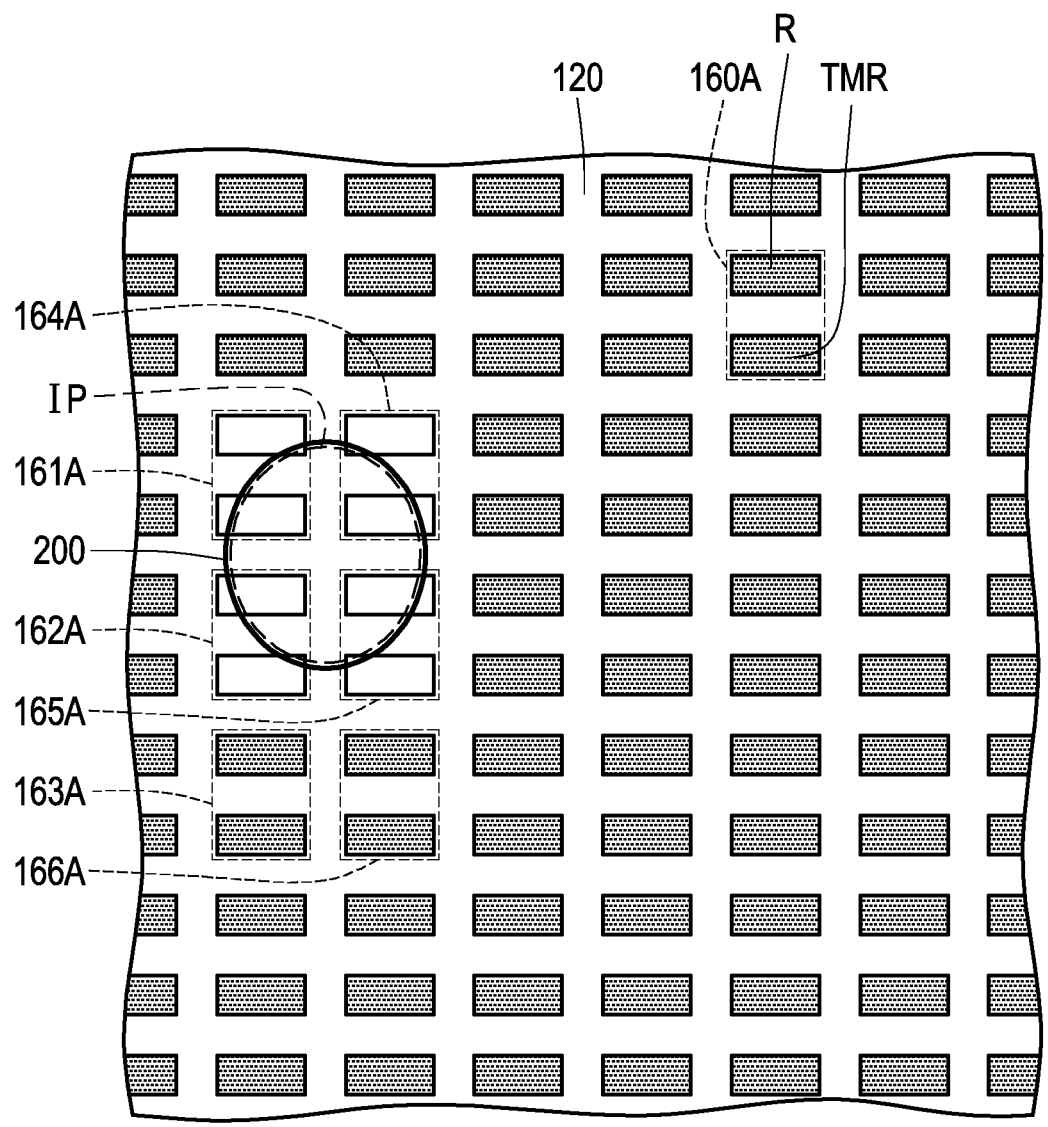
Figure 16B:
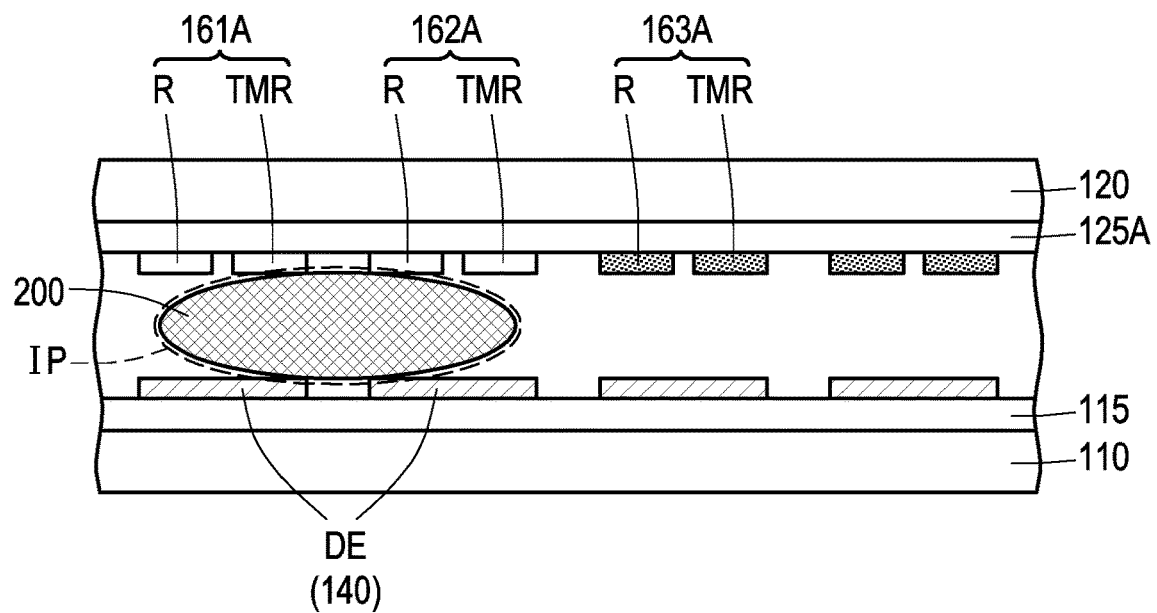

Referring to FIG. 15B and FIG. 16B, after obtaining the initial position IP of the microfluid 200, the heating units 160A (e.g., the heating unit 161A, the heating unit 162A, the heating unit 164A, and the heating unit 165A) in contact with the microfluid 200 at the initial position IP are disabled. At this time, the heating units 160A (e.g., the heating unit 163A and the heating unit 166A) that are not in contact with the microfluid 200 at the initial position IP remain enabled.

Figure 15C:
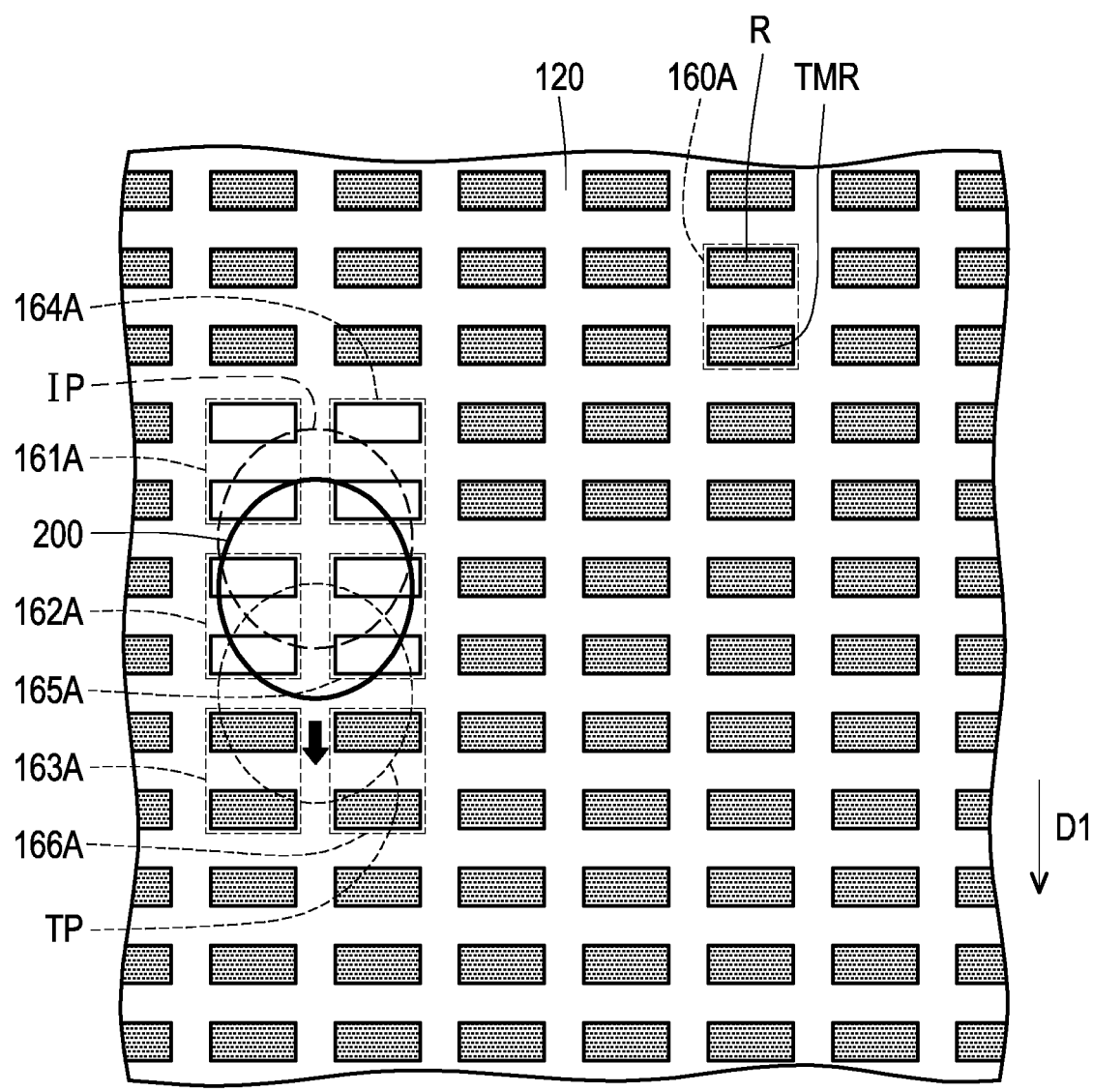
Figure 16C:
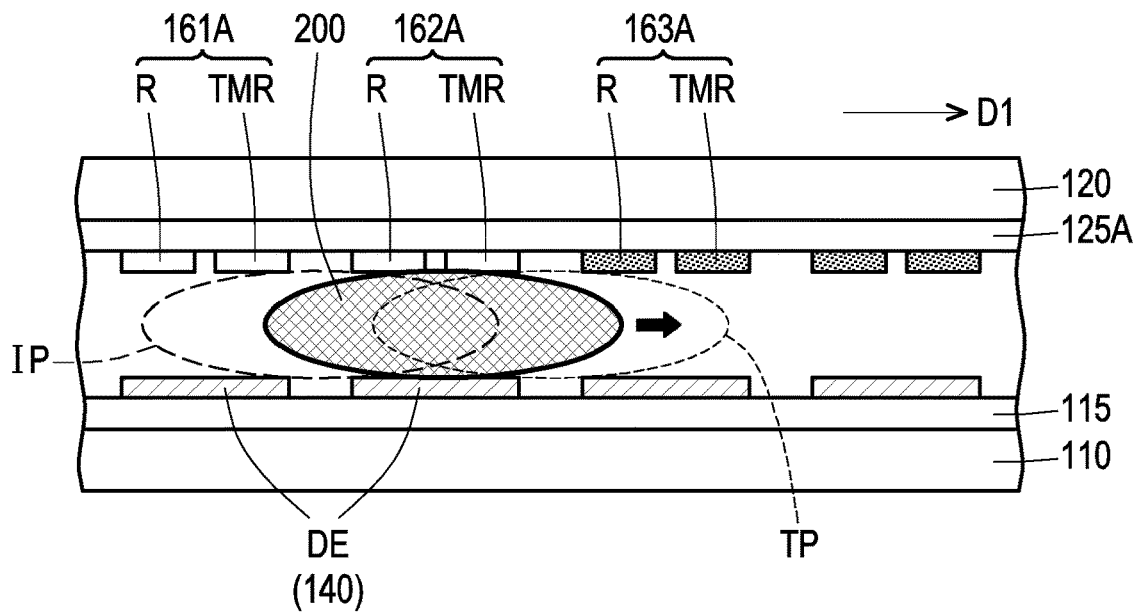

Next, at least two adjacent actuating units 140 of the plurality of actuating units 140 are enabled, so that the microfluid 200 moves from the initial position IP to the target position TP. For example, the target position TP in this embodiment is a position overlapping with the heating unit 162A, the heating unit 163A, the heating unit 165A, and the heating unit 166A, and the microfluid 200 moves from the initial position IP to the target position TP along the direction D1, as shown in FIG. 15C and FIG. 16C. When the microfluid 200 is to be moved, the four actuating units 140 overlapping with the heating unit 162A, the heating unit 163A, the heating unit 165A, and the heating unit 166A are enabled. Since the principle of moving the microfluid 200 is similar to that in the embodiment shown in FIG. 3, reference may be made to the relevant paragraphs of the embodiments above for detailed descriptions, which shall not be repeated herein.

Figure 15D:
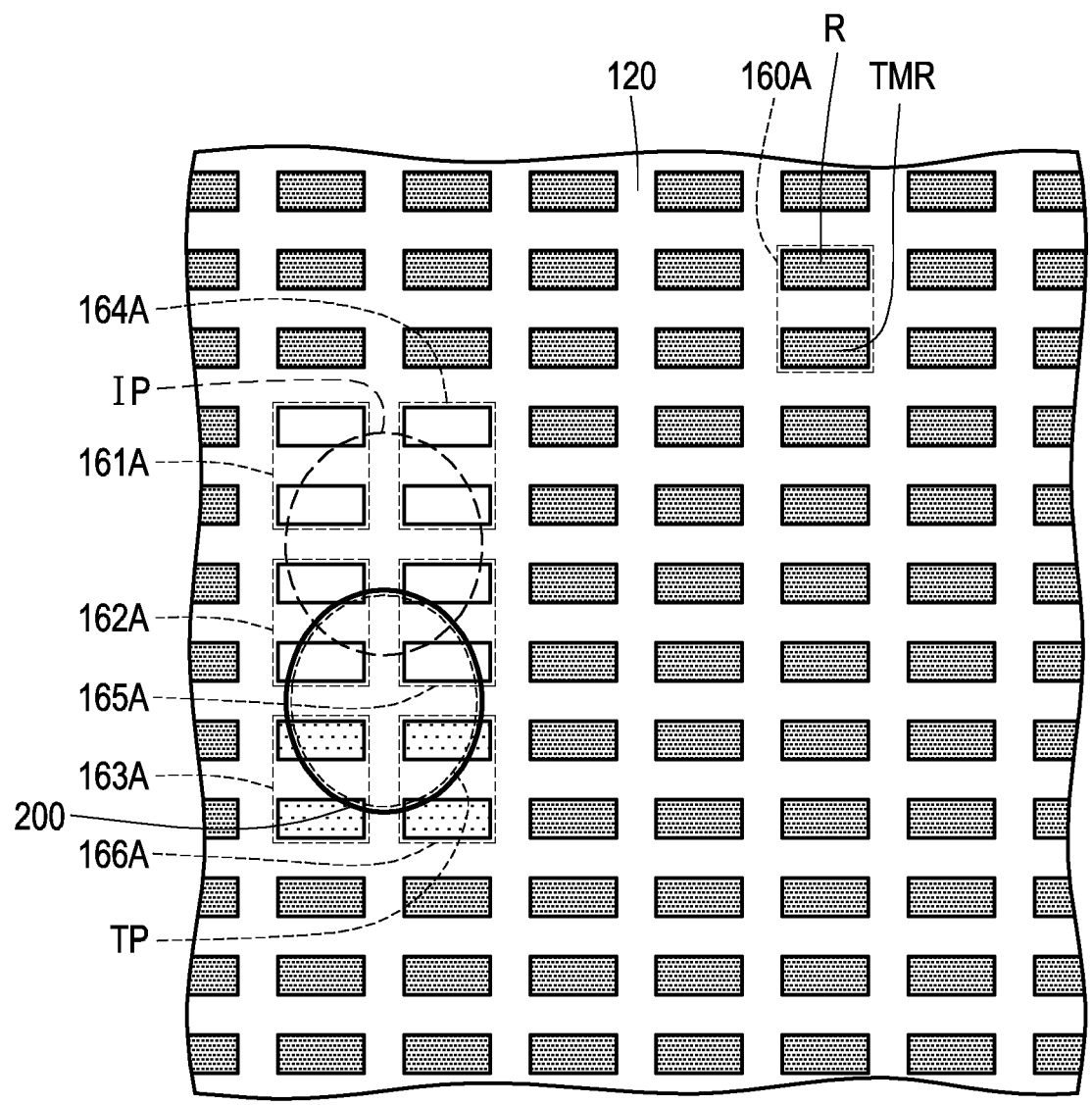
Figure 16D:
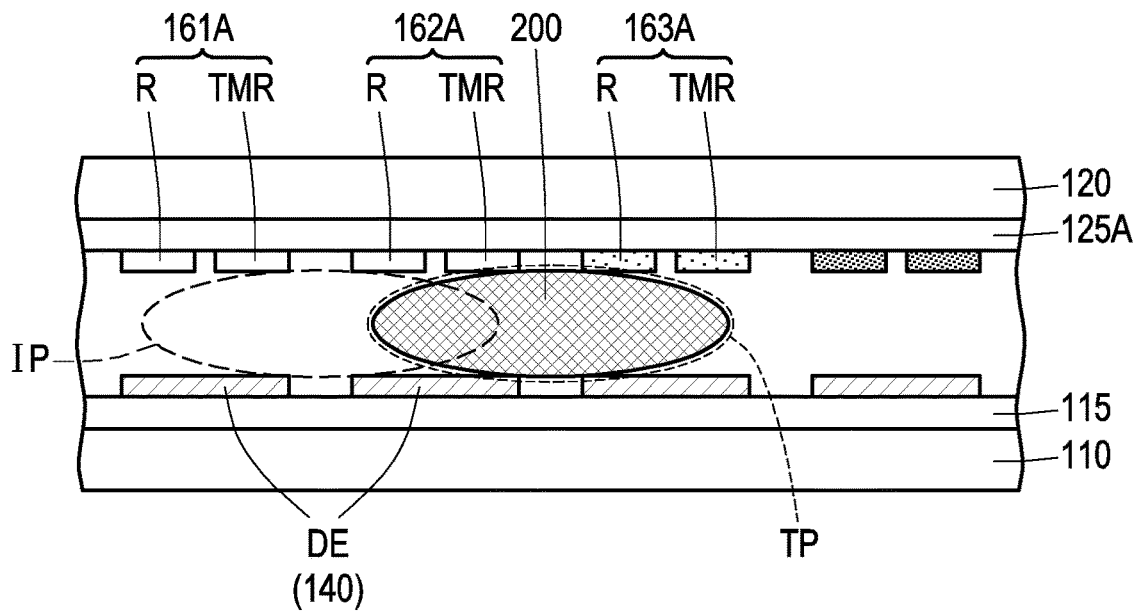

Referring to FIG. 15D and FIG. 16D, when the microfluid 200 moves to the target position TP and contacts the heating unit 163A and the heating unit 166A, the temperatures of the negative temperature coefficient thermistors TMR of the heating unit 163A and the heating unit 166A decrease. That is, the resistance values of the negative temperature coefficient thermistors TMR of the heating unit 163A and the heating unit 166A are higher than the resistance values of the negative temperature coefficient thermistors TMR of other heating units 160A that are not in contact with the microfluid 200 and are enabled. Therefore, the cross voltages across the negative temperature coefficient thermistors TMR of the heating unit 163A and the heating unit 166A are greater than the cross voltages across the negative temperature coefficient thermistors TMR of other heating units 160A that are not in contact with the microfluid 200 and are enabled.

Figure 15E:
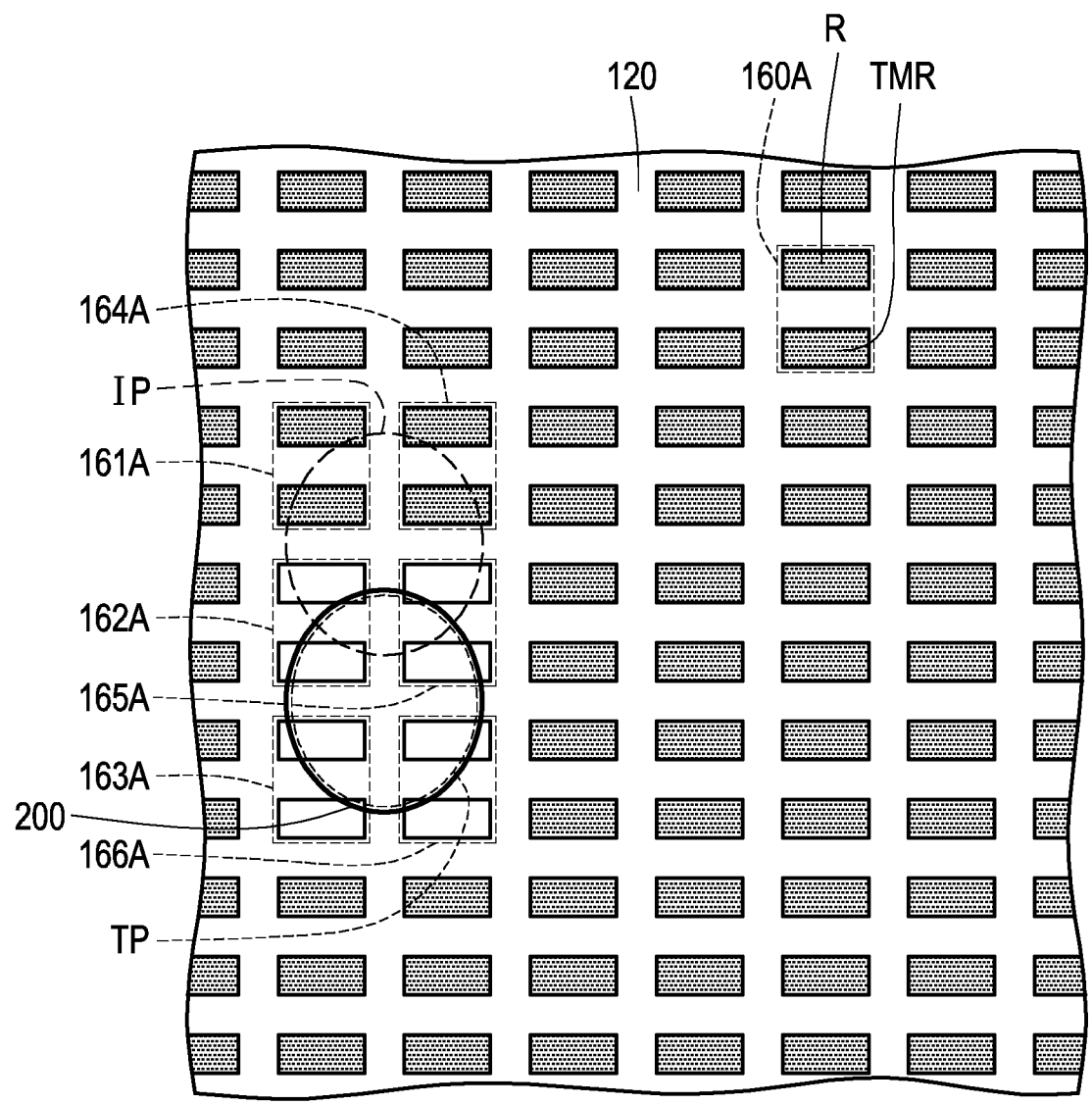
Figure 16E:
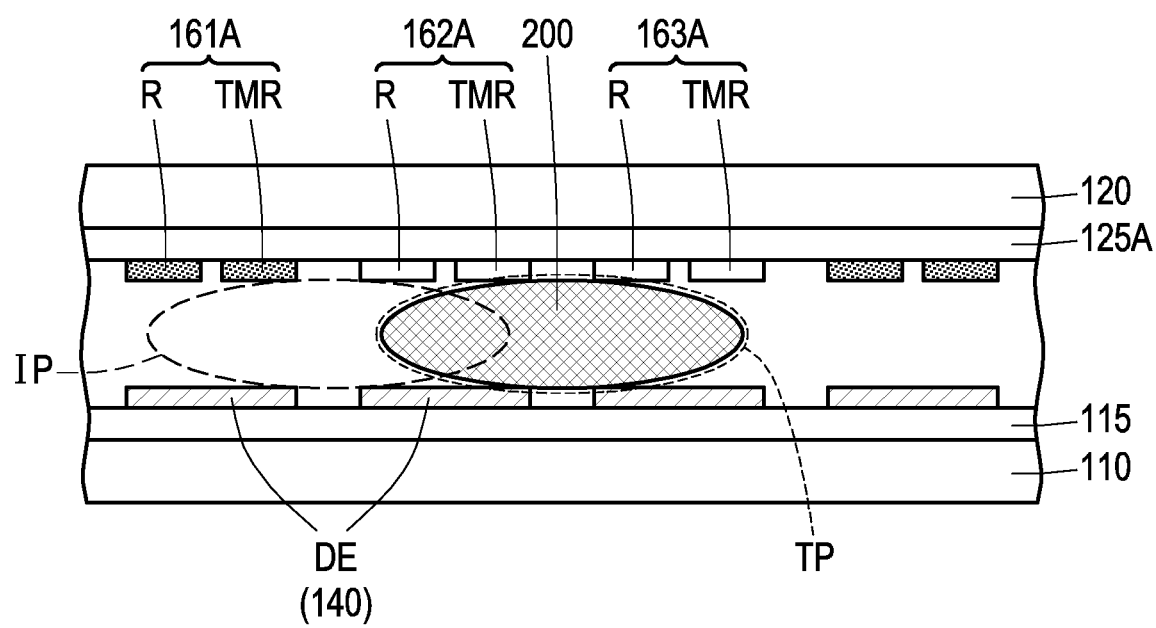

At this time, if the cross voltages across the negative temperature coefficient thermistors TMR of the heating units 160A are interpreted, it can be confirmed whether the microfluid 200 has moved to the target position TP. After confirming that the microfluid 200 has moved to the target position TP, the heating units 160A (e.g., the heating unit 162A, the heating unit 163A, the heating unit 165A, and the heating unit 166A) in contact with the microfluid 200 are disabled, and the heating unit 161A and the heating unit 164A which overlap with the initial position IP but are not in contact with the microfluid 200 are enabled, as shown in FIG. 15E and FIG. 16E.

With the operation method described above, in addition to heating the microfluid 200, the heating units 160A may also be used to detect the position of the microfluid 200. That is, the position of the microfluid 200 can be obtained without additionally providing sensors, so the structural design of the microfluidic chip 20 can be simplified. In addition, during the movement of the microfluid 200, it is also possible to confirm in real time whether the microfluid 200 has moved to the target position TP according to the method described above, which makes real time detection possible.

In summary of the above, in the microfluidic chip and the method for using the same according to an embodiment of the disclosure, in addition to heating the microfluid, the heating units may also be used to detect the position of the microfluid. In the heating process, a resistance value change of the negative temperature coefficient thermistor of the heating unit covered by the microfluid is different from that of the negative temperature coefficient thermistor of other heating units not covered by the microfluid. The position of the microfluid is obtained by detecting a change in the cross voltage or current arising from the resistance value change. Since the microfluidic chip of the disclosure can obtain the position of the microfluid without additionally providing sensors, it can have a simplified structural design.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A microfluidic chip suitable for controlling movement of a microfluid and detecting a position of the microfluid, the microfluidic chip comprising:
    a first substrate;
    a second substrate disposed opposite to the first substrate, wherein the first substrate and the second substrate are spaced apart to form a microfluidic channel therebetween, and the microfluid is adapted to move in the microfluidic channel;
    a plurality of first scan lines and a plurality of first signal lines disposed on the first substrate;
    a plurality of second scan lines and a plurality of second signal lines disposed on the second substrate;
    a plurality of actuating units disposed on the first substrate, wherein each of the plurality of actuating units comprises a first active device and a driving electrode, and the first active device is electrically connected to one of the plurality of first scan lines, one of the plurality of first signal lines, and the driving electrode, a control terminal of the first active device receives a first scan signal from the one of the plurality of first scan lines, a source terminal of the first active device receives a first voltage signal from the one of the plurality of first signal lines, and the driving electrode is electrically connected to a drain terminal of the first active device; and
    a plurality of heating units disposed on the second substrate and respectively overlapping the plurality of actuating units along a stacking direction of the first substrate and the second substrate, wherein the plurality of heating units are structurally separated from the plurality of actuating units, each of the plurality of heating units comprises a second active device and a negative temperature coefficient thermistor, and the second active device is electrically connected to one of the plurality of second scan lines and one of the plurality of second signal lines, a control terminal of the second active device receives a second scan signal from the one of the plurality of second scan lines, a source terminal of the second active device receives a second voltage signal from the one of the plurality of second signal lines, and a first terminal of the negative temperature coefficient thermistor is electrically connected to a drain terminal of the second active device.

2. The microfluidic chip according to claim 1, further comprising:
    a reading chip, electrically connected to a second terminal of the negative temperature coefficient thermistor.

3. The microfluidic chip according to claim 1, wherein the negative temperature coefficient thermistor of any one of the plurality of heating units overlaps with the driving electrode of one of the plurality of actuating units overlapping the any one of the plurality of heating units along the stacking direction of the first substrate and the second substrate.

4. The microfluidic chip according to claim 1, wherein each of the plurality of heating units further comprises a resistor, a first terminal of the resistor is electrically connected to the drain terminal of the second active device, a second terminal of the resistor is electrically connected to the first terminal of the negative temperature coefficient thermistor, and a resistance value of the resistor is fixed.

5. The microfluidic chip according to claim 4, further comprising:
a plurality of third scan lines and a plurality of third signal lines disposed on the second substrate, wherein each of the plurality of heating units further comprises a third active device, the third active device is electrically connected to one of the plurality of third scan lines, one of the plurality of third signal lines, the second terminal of the resistor, and the first terminal of the negative temperature coefficient thermistor, a second terminal of the negative temperature coefficient thermistor has a ground potential, a control terminal of the third active device receives a third scan signal from the one of the plurality of third scan lines, a source terminal of the third active device is electrically connected to the second terminal of the resistor, and a drain terminal of the third active device is electrically connected to the one of the plurality of third signal lines to transmit a cross voltage across the first terminal and the second terminal of the negative temperature coefficient thermistor to a reading chip.

6. The microfluidic chip according to claim 4, wherein the resistor and the negative temperature coefficient thermistor of any one of the plurality of heating units overlap with the driving electrode of one of the plurality of actuating units overlapping the any one of the plurality of heating units along the stacking direction of the first substrate and the second substrate.

7. A method for using the microfluidic chip according to claim 1, executed by a controlling circuit of the microfluidic chip, and comprising:
applying a first current to the negative temperature coefficient thermistor of each of the plurality of heating units by turning on the second active device of each of the plurality of heating units to perform a first heating of the negative temperature coefficient thermistor;
performing a comparing step of a current value of the first current flowing through the negative temperature coefficient thermistor of each of the plurality of heating units or a cross voltage across the negative temperature coefficient thermistor of each of the plurality of heating units to obtain an initial position of the microfluid, wherein the initial position is defined by a position of a first part of the plurality of heating units which is in contact with the microfluid; and
disabling the first part of the plurality of heating units by turning off the second active device of each of the first part of the plurality of heating units.

8. The method for using the microfluidic chip according to claim 7, further comprising:
performing a moving step to move the microfluid from the initial position to a target position, wherein the moving step comprises generating a voltage difference between two driving electrodes of two actuating units among the plurality of actuating units, the two driving electrodes are arranged directly adjacent to each other, one of the two driving electrodes is in contact with the microfluid, and the target position is defined by positions of the two driving electrodes on the first substrate.

9. The method for using the microfluidic chip according to claim 8, further comprising:
performing an interpreting step of the current value of the first current flowing through the negative temperature coefficient thermistor of each of the plurality of heating units to obtain the target position of the microfluid, wherein the interpreting step of the current value of the first current comprises confirming whether the current value of the first current flowing through the negative temperature coefficient thermistor of each of the plurality of heating units is smaller than a reference current value.

10. The method for using the microfluidic chip according to claim 8, wherein before the moving step of the microfluid, the negative temperature coefficient thermistor of each of a second part of the plurality of heating units that are not in contact with the microfluid at the initial position is applied with a second current by turning on the second active device of each of the second part of the plurality of heating units to perform a second heating of the negative temperature coefficient thermistor of each of the second part of the plurality of heating units.

11. The method for using the microfluidic chip according to claim 8, wherein during the moving step of the microfluid, the negative temperature coefficient thermistor of each of a second part of the plurality of heating units that are not in contact with the microfluid at the initial position is applied with a second current by turning on the second active device of each of the second part of the plurality of heating units to perform heating.

12. The method for using the microfluidic chip according to claim 8, wherein after the comparing step and before the moving step, the plurality of heating units are disabled by turning off the second active device of each of the plurality of heating units.

13. The method for using the microfluidic chip according to claim 12, further comprising:
applying a second current to the negative temperature coefficient thermistor of each of the plurality of heating units by turning on the second active device of each of the plurality of heating units to perform a second heating of the negative temperature coefficient thermistor after the moving step of the microfluid.

14. The method for using the microfluidic chip according to claim 13, further comprising:
performing an interpreting step of the cross voltage across the negative temperature coefficient thermistor of each of the plurality of heating units to obtain the target position of the microfluid, wherein the interpreting step of the cross voltage comprises confirming whether the cross voltage across the negative temperature coefficient thermistor of each of the plurality of heating units is greater than a reference voltage value.

15. The method for using the microfluidic chip according to claim 14, wherein after the interpreting step, the plurality of heating units are disabled by turning off the second active device of each of the plurality of heating units.

16. The method for using the microfluidic chip according to claim 8, wherein after the moving step of the microfluid, the second active device of each of the plurality of heating units is turned off in a first time interval, and the negative temperature coefficient thermistor of each of the plurality of heating units is applied with a second current by turning on the second active device of each of the plurality of heating units in a second time interval to perform a second heating, wherein the second time interval falls after the first time interval.

17. The method for using the microfluidic chip according to claim 16, further comprising:
performing an interpreting step of the cross voltage across the negative temperature coefficient thermistor of each of the plurality of heating units in the second time interval to obtain the target position of the microfluid, wherein the interpreting step of the cross voltage comprises confirming whether the cross voltage across the negative temperature coefficient thermistor of each of the plurality of heating units is greater than a reference voltage value.

18. The method for using the microfluidic chip according to claim 17, wherein after the interpreting step, the plurality of heating units are disabled by turning off the second active device of each of the plurality of heating units.

* * * * *